United States Patent
Yamazaki

(10) Patent No.: US 9,152,341 B2
(45) Date of Patent: Oct. 6, 2015

(54) STORAGE SYSTEM, STORAGE CONTROLLER, AND METHOD FOR ELIMINATING DATA DUPLICATION BASED ON HASH TABLE

(71) Applicants: KABUSHIKI KAISHA TOSHIBA, Tokyo (JP); TOSHIBA SOLUTIONS CORPORATION, Tokyo (JP)

(72) Inventor: Shuji Yamazaki, Ome (JP)

(73) Assignees: KABUSHIKI KAISHA TOSHIBA, Tokyo (JP); TOSHIBA SOLUTIONS CORPORATION, Tokyo (JP)

(*) Notice: Subject to any disclaimer, the term of this patent is extended or adjusted under 35 U.S.C. 154(b) by 163 days.

(21) Appl. No.: 13/955,626

(22) Filed: Jul. 31, 2013

(65) Prior Publication Data

US 2014/0297980 A1    Oct. 2, 2014

Related U.S. Application Data

(63) Continuation of application No. PCT/JP2013/059530, filed on Mar. 29, 2013.

(51) Int. Cl.
 *G06F 3/06* (2006.01)
(52) U.S. Cl.
 CPC .............. *G06F 3/065* (2013.01); *G06F 3/0614* (2013.01); *G06F 3/0673* (2013.01)
(58) Field of Classification Search
 CPC ...... G06F 3/0614; G06F 3/0673; G06F 3/065
 See application file for complete search history.

(56) References Cited

U.S. PATENT DOCUMENTS

| | | | |
|---|---|---|---|
| 2009/0083563 A1* | 3/2009 | Murase | 713/324 |
| 2011/0016132 A1 | 1/2011 | Okamoto | |
| 2011/0225191 A1 | 9/2011 | Xie | |

FOREIGN PATENT DOCUMENTS

| | | |
|---|---|---|
| JP | 3-282966 | 12/1991 |
| JP | 2004-265422 | 9/2004 |
| JP | 2008-533570 | 8/2008 |
| JP | 2010-146308 | 7/2010 |
| JP | 2011-22721 | 2/2011 |
| JP | 2012-505440 | 3/2012 |
| JP | 2012-133551 | 7/2012 |
| JP | 2013-58133 | 3/2013 |

OTHER PUBLICATIONS

International Search Report dated May 28, 2013, issued in International Application No. PCT/JP2013/059530 (2 pages).
First Office Action issued by the Japanese Patent Office on Sep. 3, 2013, for Japanese Patent Application No. 2013-517504, and English-language translation thereof.

* cited by examiner

*Primary Examiner* — Aracelis Ruiz
(74) *Attorney, Agent, or Firm* — Finnegan, Henderson, Farabow, Garrett & Dunner, LLP

(57) ABSTRACT

According to one embodiment, a storage controller includes a dividing unit, a duplication manager, and a duplication determination unit. The dividing unit divides data specified in a write request from a host computer into a plurality of chunks. The duplication manager preferentially stores a first hash value of a first chunk in a first table in a hash table in association with the first chunk when the first chunk is written to a storage device. The hash table includes a second table having more entries than the first table. The duplication determination unit first searches the first table for a third hash value matching a second hash value of a second chunk when the second hash value has been calculated.

9 Claims, 14 Drawing Sheets

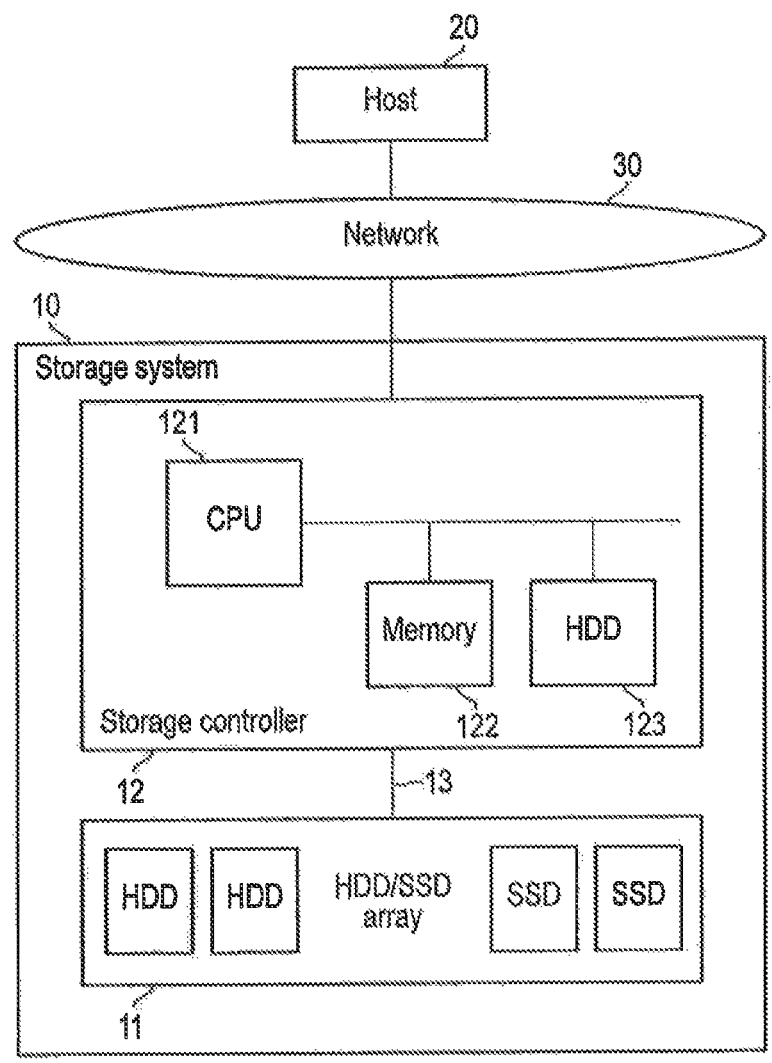
F I G. 1

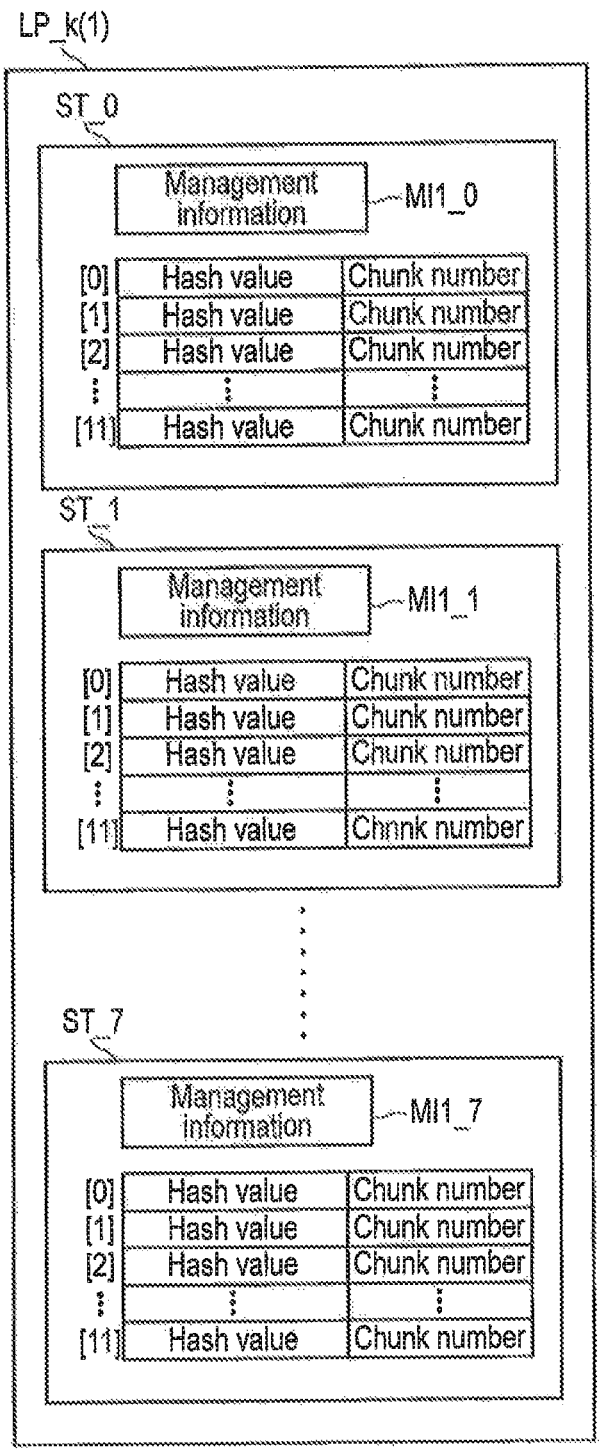
F I G. 5

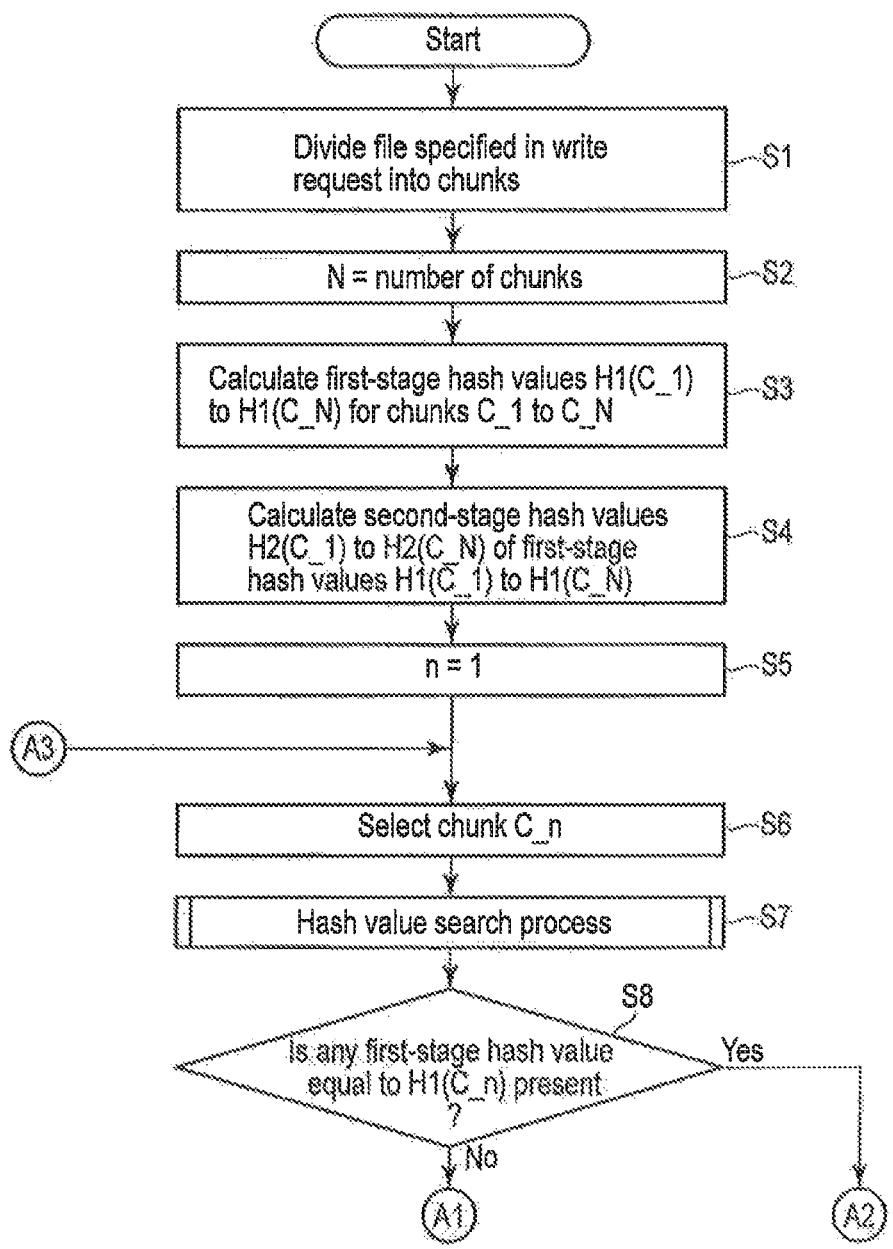
F I G. 10

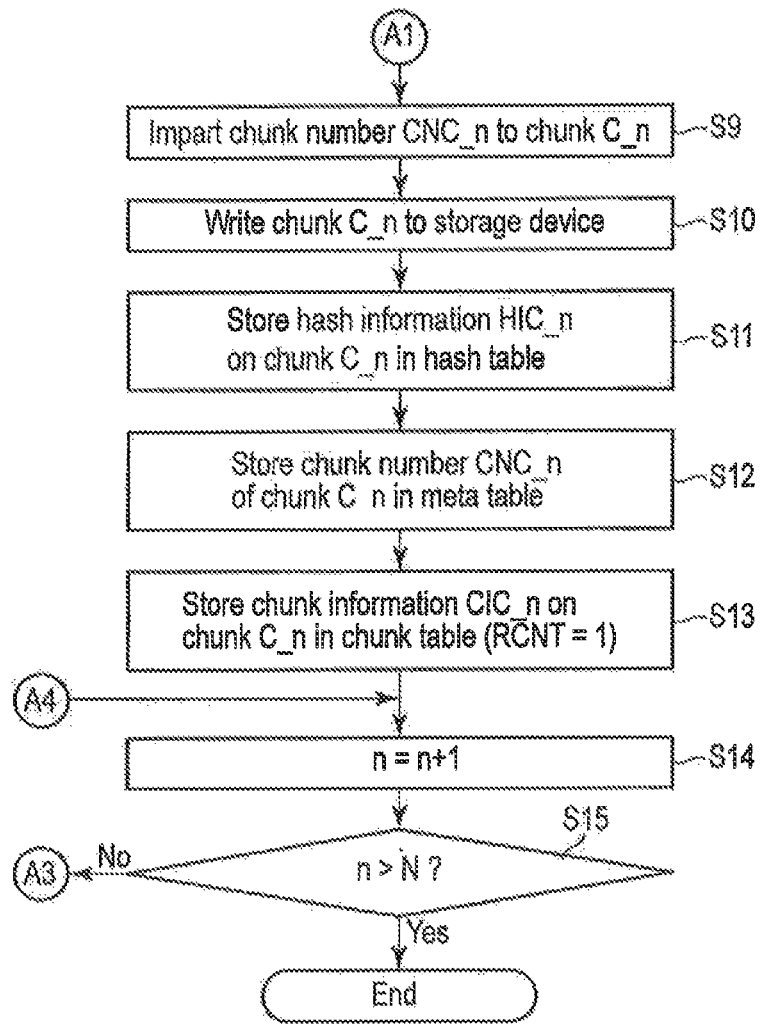
F I G. 11

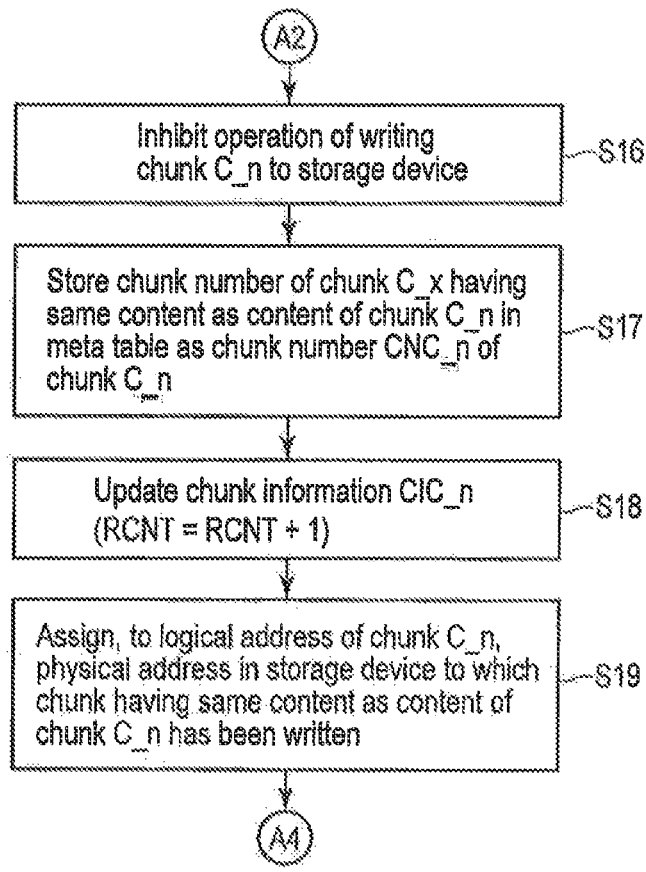
F I G. 12

F I G. 17A

F I G. 17B

F I G. 17C

F I G. 17D

| Chunk number | Chunk table | 207 |
|---|---|---|
| 0 | Pa0 | RCNT=1 |
| 1 | Pa1 | RCNT=1 |
| 2 | Pa2 | RCNT=1 |
| 3 | Pa3 | RCNT=1 |
| 4 | | |
| 5 | | |
| 6 | | |
| 7 | | |

F I G. 18A

| Chunk number | Chunk table | 207 |
|---|---|---|
| 0 | Pa0 | RCNT=2 |
| 1 | Pa1 | RCNT=1 |
| 2 | Pa2 | RCNT=1 |
| 3 | Pa3 | RCNT=1 |
| 4 | Pb0 | RCNT=1 |
| 5 | Pb1 | RCNT=1 |
| 6 | | |
| 7 | | |

F I G. 18B

| Chunk number | Chunk table | 207 |
|---|---|---|
| 0 | Pa0 | RCNT=3 |
| 1 | Pa1 | RCNT=1 |
| 2 | Pa2 | RCNT=1 |
| 3 | Pa3 | RCNT=1 |
| 4 | Pb0 | RCNT=1 |
| 5 | Pb1 | RCNT=1 |
| 6 | Pc0 | RCNT=1 |
| 7 | Pc1 | RCNT=1 |

F I G. 18C

| Chunk number | Chunk table | 207 |
|---|---|---|
| 0 | Pa0 | RCNT=2 |
| 1 | Pa1 | RCNT=1 |
| 2 | Pa2 | RCNT=1 |
| 3 | Pa3 | RCNT=1 |
| 4 | Pb0 | RCNT=0 |
| 5 | Pb1 | RCNT=0 |
| 6 | Pc0 | RCNT=1 |
| 7 | Pc1 | RCNT=1 |

F I G. 18D

STORAGE SYSTEM, STORAGE CONTROLLER, AND METHOD FOR ELIMINATING DATA DUPLICATION BASED ON HASH TABLE

CROSS REFERENCE TO RELATED APPLICATIONS

This application is a Continuation Application of PCT Application No. PCT/JP2013/059530, filed Mar. 29, 2013, the entire contents of which are incorporated herein by reference.

FIELD

Embodiments described herein relate generally to a storage system, a storage controller, and a method for eliminating data duplication based on a hash table.

BACKGROUND

In recent years, an increase in the capacities of storage devices has been promoted in order to allow storage of big data used for information processing systems. Big data generally includes many duplicate data. Thus, if big data is stored in a storage device, a part of the storage area in the storage device is occupied by many duplicate data. This results in wastage of the storage capacity of the storage device. Hence, for effective use of the limited storage capacity of the storage device, the duplicate data needs to be eliminated from the data to be stored in the storage device.

An example of a conventional method for eliminating duplicate data will be described. When writing data to a storage device, a storage controller determines whether the same data as the data to be written has already been written to the storage device. For such determination, the storage controller divides the data (file) to be written into masses of data of fixed length, referred to as chunks.

The storage controller uses a hash function to calculate a hash value for each of the chunks. When writing the chunk used to calculate a hash value to the storage device, the storage controller stores the hash value in a hash table in association with the chunk.

Thus, in calculating the hash value of a first chunk to be newly written to the storage device, the storage controller determines whether the same hash value as the hash value of the first chunk is stored in the hash table. More specifically, the storage controller determines whether data overlapping the first chunk has already been written to the storage device based on whether the same hash value is stored in the hash table. The storage controller writes the first chunk to the storage device only if no data overlapping the first chunk has been written to the storage device. This eliminates the duplicate data from the storage device.

An increased number of chunks written to the storage device increase the number of hash values stored in the hash table in association with the chunks. Thus, in order to allow many hash values to be stored, the conventional technique applies a hash table having a multistage configuration including a plurality of tables each having the same number of entries.

As described above, if the hash table is used to store a large number of hash values, the storage capacity needed to store the hash table increases. It is difficult to store the entire such hash table in a memory provided in the storage controller. Thus, the hash table is generally stored in a large-capacity storage device used to store big data or a local storage device such as a hard disk drive (HDD) which is provided in the storage controller. On the other hand, the conventional technique applies the hash table having the multistage configuration including a plurality of tables each having the same number of entries.

Thus, when the storage controller searches a hash table configured as described above in order to compare hash values with each other, many input/output (I/O) processes occur between the storage controller and the storage device. When many I/O processes result from the comparison of hash values for elimination of duplicate data, the write performance (write speed) of the storage device is degraded.

BRIEF DESCRIPTION OF THE DRAWINGS

FIG. 1 is a block diagram showing an exemplary configuration of a computer system according to an embodiment;

FIG. 5 is a diagram showing an example of a data structure of a leaf page in a first-stage table included in the hash table shown in FIG. 4;

FIG. 10 is a diagram showing a part of a flowchart illustrating an exemplary procedure for a data write process according to the embodiment;

FIG. 11 is a diagram showing another part of the flowchart illustrating the exemplary procedure for the data write process;

FIG. 12 is a diagram showing the remaining part of the flowchart illustrating the exemplary procedure for the data write process;

FIGS. 17A, 17B, 17C, and 17D are diagrams showing an example of a variation in the contents of the meta table; and FIGS. 18A, 18B, 18C, and 18D are diagrams showing an example of a variation in the contents of the chunk table.

DETAILED DESCRIPTION

Figure 2:
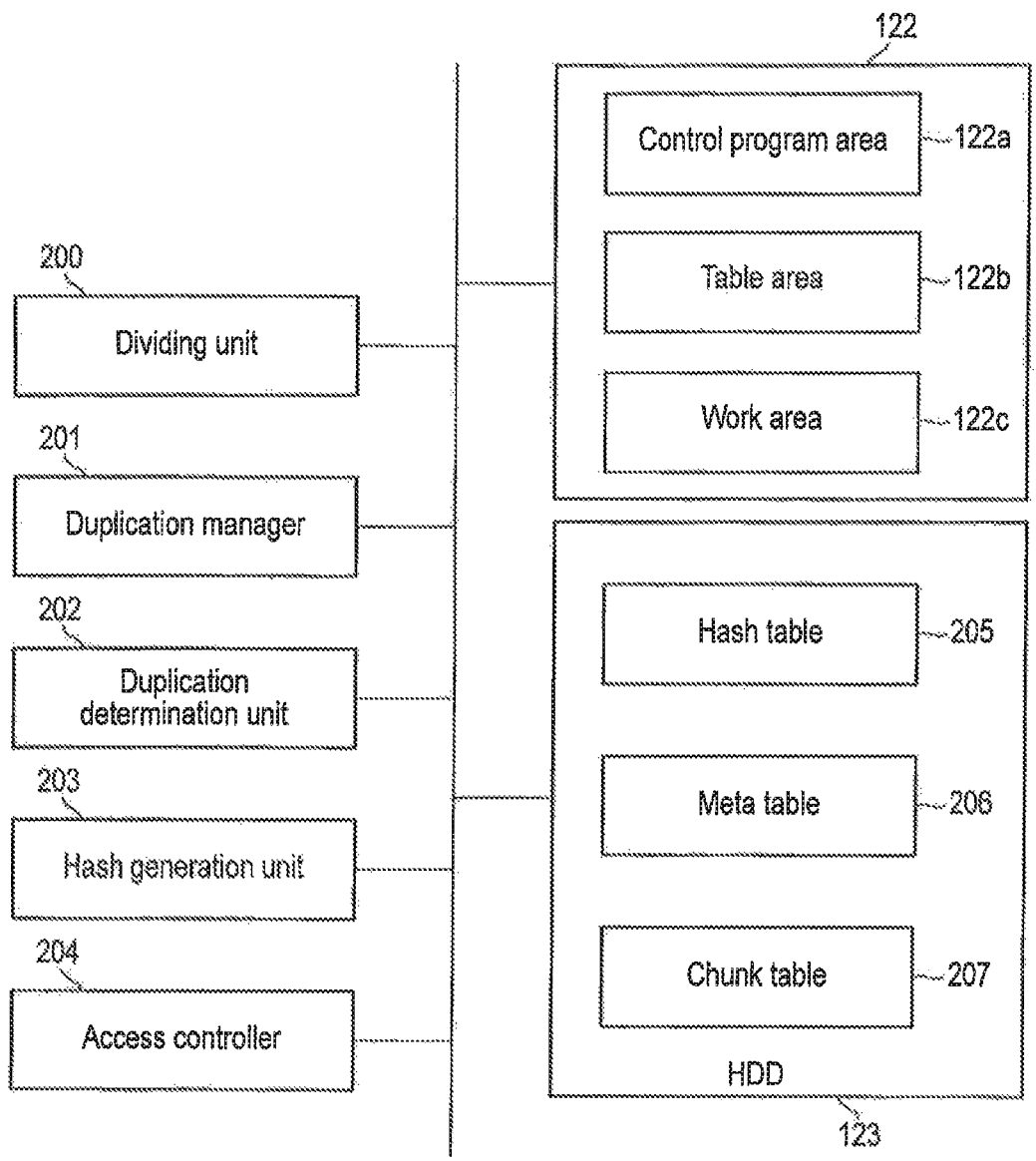
FIG. 2 is a block diagram mainly showing an exemplary functional configuration of a storage controller shown in FIG. 1.

In general, according to one embodiment, a storage system comprises a storage device, a storage controller, and a hash table. The storage controller is configured to control access to the storage device. The hash table includes a first table and a second table. The first table has a first number of entries, and the second table has a second number of entries. The second number is larger than the first number. The storage controller comprises a dividing unit, a hash generation unit, an access controller, a duplication manager, and a duplication determination unit. The dividing unit is configured to divide data specified in a write request from a host computer into a plurality of chunks. The hash generation unit is configured to calculate a hash value for each of the plurality of chunks based on the data in each of the plurality of chunks. The hash value has a first length. The access controller is configured to write the chunks to the storage device. The duplication manager is configured to preferentially store a first hash value of a first chunk in the first table in the hash table in association with the first chunk when the first chunk is written to the storage device. The duplication determination unit is configured to determine whether a third chunk is stored in the storage device by executing a process of searching the hash table for a third hash value matching a second hash value of a second chunk such that the first table is preferentially searched when the second hash value has been calculated. The third chunk has a content identical to a content of the second chunk. The duplication manager is further configured to inhibit the second chunk from being written to the storage device when the third chunk is determined to be stored in the storage device.

FIG. 1 is a block diagram showing an exemplary hardware configuration of a computer system according to an embodiment. The computer system comprises a storage system 10 and a host computer 20 (hereinafter referred to as a host) 20. The storage system 10 is connected to the host 20 via a network 30.

The host 20 is a physical computer such as a server or a client personal computer (client PC). In the host 20, an application program operates to access data in the storage system 10. In accordance with the application program, the host 20 utilizes the storage system 10 (more specifically, an HDD/SSD array 11 provided in the storage system 10 and described later) via the network 30 as an external storage device. The network 30 is, for example, a storage area network (SAN), the Internet, or an intranet. The Internet or the intranet is comprised of, for example, Ethernet (registered trade mark). The host 20 may be connected to the storage system 10 via a host interface bus such as a fibre channel (FC), a small computer system interface (SCSI) bus, a serial attached SCSI (SAS) bus, or a serial AT attachment (SATA) bus.

The storage system 10 comprises an HDD/SSD array 11 and a storage controller 12. According to the embodiment, the HDD/SSD array 11 and the storage controller 12 form a storage device. The HDD/SSD array 11 is, for example, a RAID (Redundant Arrays of Inexpensive Disks or Redundant Arrays of Independent Disks) array configured using a plurality of hard disk drives (HDDs) and a plurality of solid state drives (SSDs). The HDD/SSD array 11 is connected to the storage controller 12 (more specifically, a storage interface provided in the storage controller 12 and not shown in the drawings) via a storage interface bus 13. According to the embodiment, the storage interface bus 13 is an FC (fibre channel). However, the storage interface bus 13 may be a interface bus other than the FC, such as a SCSI bus, a SAS bus, or a SATA bus.

The storage controller 12 controls access to the HDD/SSD array 11 via the storage interface bus 13. The storage controller 12 is connected to the host 20 via the network 30. The storage controller 12 receives a read request or a write request including a specified logical address, from the host 20. The storage controller 12 uses an address translation function and thus translates the specified logical address into a physical address indicative of a physical area in the HDD/SSD array 11 to which the logical address is mapped. This operation will be described in further detail taking a case of data read as an example. The storage controller 12 translates the logical address into a chunk number assigned to data (chunk) specified by the logical address. The chunk will be described later. The storage controller 12 translates the chunk number into a physical address indicative of a physical area in the HDD/SSD array 11 in which the chunk indicated by the chunk number is stored. Based on the physical address, the storage controller 12 accesses the HDD/SSD array 11.

The storage controller 12 comprises a CPU 121, a memory 122, and a hard disk drive (HDD) 123. The CPU 121 executes a process requested of the storage controller 22 in accordance with program codes in a control program stored in a control program area 122a provided in the memory 122 and described later. The memory 122 is, for example, a volatile memory configured using a plurality of DRAMs. The HDD 123 is a local storage device used to store control programs and various tables. Instead of the HDD 123, a storage device may be used in which a plurality of flash memories are mounted.

According to the embodiment, the storage controller 12 is provided in a storage device including the HDD/SSD array 11. However, the storage controller 12 may be provided independently of the storage device. In this case, the storage controller 12 may be built into the host 20. Alternatively, the storage controller 12 (more specifically, the functions of the storage controller 12) may be implemented using some of the functions of an operating system (OS) provided in the host 20.

Alternatively, the storage controller 12 may be provided in a card installed in a card slot in the host 20. A part of the storage controller 12 may be built into host 20, whereas the remaining part of the storage controller 12 may be provided in the card.

Alternatively, instead of the HDD/SSD array 11, for example, a RAID array configured using a plurality of HDDs or a RAID array configured using a plurality of SSDs may be applied. Instead of the HDD/SSD array 11 (that is, the RAID array), a simple set of a plurality of storage drives (drive array), which does not have a RAID configuration, may be applied.

FIG. 2 is a block diagram mainly showing an exemplary functional configuration of the storage controller 12 shown in FIG. 1. The storage controller 12 comprises a dividing unit 200, a duplication manager 201, a duplication determination unit 202, a hash generation unit 203, and an access controller 204. The functions of the dividing unit 200, the duplication manager 201, the duplication determination unit 202, the hash generation unit 203, and the access controller 204 will be described later. The functional elements 200 to 204 are software modules implemented by the CPU 121 in the storage controller 12 shown in FIG. 1, by executing a control program. However, some or all of the functional elements 200 to 204 may be implemented by hardware modules.

The memory 122 includes a control program area 122a, a table area 122b, and a work area 122c. The control program area 122a is used to store at least a part of the control program executed by the CPU 121. The control program is prestored in the HDD 123 as described above. At least a part of the control program is loaded from the HDD 123 into the control program area 122a when the storage controller 12 is started.

The table area 122b is used to store at least some of various tables stored in the HDD 13. The work area 122c is used to store temporary data utilized when the CPU 121 executes the control program.

The HDD 123 (that is, a local storage device) stores, in addition to the control program, a hash table 205, a meta table 206, and a chunk table 207 which will be described later. That is, the HDD 123 includes storage areas in which the control program, the hash table 205, the meta table 206, and the chunk table 207, respectively, are stored.

Figure 3:
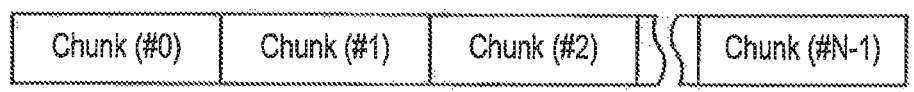
FIG. 3 is a diagram showing an example of relations between data in a file specified in a write request from a host computer and chunks of the data.

FIG. 3 shows an example of relations between data in a file specified in a write request from the host 20 and chunks of the data. The dividing unit 200 divides the file shown in FIG. 3 into masses of data each having a fixed length, for example, 4 kilobytes (4K bytes). Masses of data each of 4K bytes are referred to as chunks. The duplication manager 201 manages the presence or absence of duplication for each chunk. In an example in FIG. 3, a file F has a size of 4NK bytes. In this case, the file F is divided into N chunks #0 to #N−1. The duplication manager 201 provides the chunks #0 to #N−1 with chunk numbers that are unique identification numbers. According to the embodiment, the chunk number is expressed using 8 bytes.

Now, the hash table 205 stored in the HDD 123 will be described in brief. The hash table 205 is used to store hash information for each chunk provided with a chunk number. The hash information includes, for example, a pair of a 32-byte hash value calculated based on the corresponding chunk and the 8-byte chunk number of the chunk. That is, the hash table 205 is used to store hash information that associates the hash value of each chunk with the chunk number of the chunk.

The hash table 205 is used to allow the duplication determination unit 202 to determine whether a chunk having the same content as the content of a chunk to be written to the HDD/SSD array 11 has already been written to the HDD/SSD array 11. Based on the result of the determination by the duplication determination unit 202, the duplication manager 201 inhibits a plurality of chunks having the same content from being written to the HDD/SSD array 11 in a duplicate manner. This eliminates data duplication.

Now, the elimination of data duplication applied according to the embodiment will be described in brief. First, it is assumed that the host 20 requests the storage controller 12 in the storage system 10 to write a file including a chunk A. Furthermore, the chunk A is assumed to have a hash value H(A). The duplication determination unit 202 sequentially compares the hash value H(A) of the chunk A with hash values stored in the hash table 205. Based on the result of the comparison, the duplication determination unit 202 determines whether a chunk having the same content as that of the chunk A (this chunk is hereinafter referred to as a representative chunk A) is stored in the HDD/SSD array 11.

If the hash table 205 stores a hash value matching the hash value H(A) (that is, the hash value stored in the hash table 205 is the hash value H(A)), the duplication determination unit 202 determines that the representative chunk A is stored in the HDD/SSD array 11. That is, the duplication determination unit 202 determines that the chunk A is duplicated. On the other hand, when the hash table 205 does not store the hash value H(A), the duplication determination unit 202 determines that the chunk A is not duplicated.

If the chunk A is determined not to be duplicated, the access controller 204 writes the chunk A to an address in the HDD/SSD array 11 specified in the write request. More specifically, the access controller 204 writes the chunk A to a physical area in the HDD/SSD array 11 indicated by the physical address assigned to the logical address specified in the write request from the host 20. At this time, the duplication manager 201 stores hash information including a pair of the hash value H(A) and the chunk number of the chunk A, in the hash table 205.

On the other hand, if the chunk A is determined to be duplicated, the duplication manager 201 inhibits the access controller 204 from writing the chunk A to the HDD/SSD array 11. In this case, the duplication manager 201 assigns (that is, maps) the physical address at which the representative chunk A has already been written to the HDD/SSD array 11, to the logical address specified in the write request from the host 20.

Figure 4:
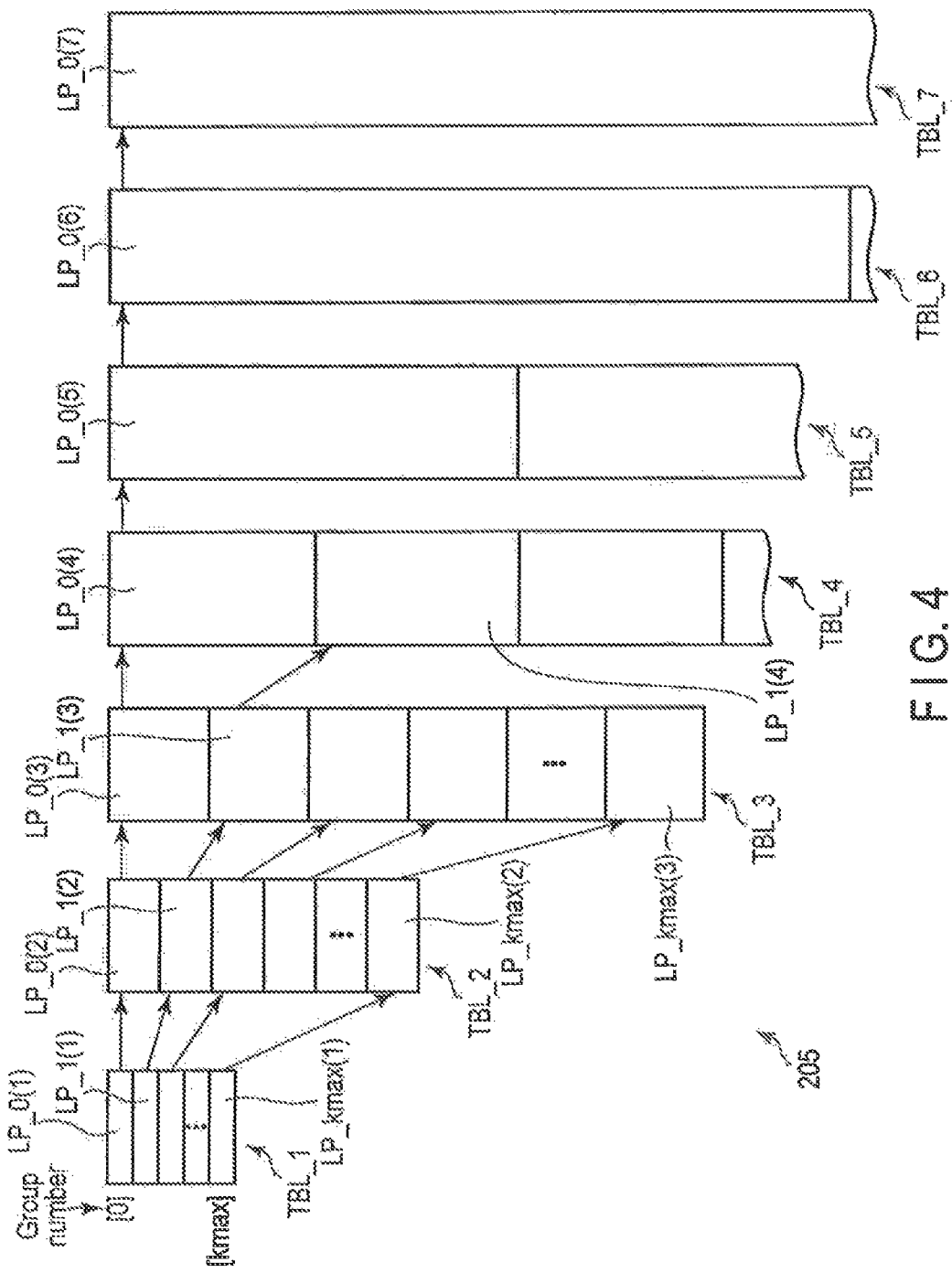
FIG. 4 is a diagram showing an example of a data structure of a hash table shown in FIG. 2.

FIG. 4 shows an example of the data structure of the hash table 205 shown in FIG. 2. The hash table 205 has a multistage configuration including a plurality of tables. In an example in FIG. 4, the hash table 205 is configured using seven tables TBL_1, TBL_2, TBL_3, TBL_4, TBL_5, TBL_6, and TBL_7. That is, the hash table 205 has a seven-stage configuration. The table TBL_h (h=1, 2, 3, 4, 5, 6, 7) is the hth-stage table in the hash table 205.

Each of the tables TBL_1 to TBL_7 includes "kmax+1" pages (hereinafter referred to as leaf pages). The kth (k=0, 1, . . . , kmax) leaf page in the table TBL_h is denoted by LP_k(h). The leaf page LP_k(h) is associated with a group G_k (group number k or group index k) described later. The leaf page LP_k(h) is used to store hash information including a pair of a hash value (more specifically, a first-stage hash value described later) belonging to the group G_k and a chunk number for identifying the chunk used to calculate the hash value.

The leaf pages LP_k(1) to LP_k(7) in the tables TBL_1 to TBL_7 vary in size and thus in the number of entries used to store hash information. Now, the sizes of (the numbers of entries in) the leaf pages LP_k(1), LP_k(2), LP_k(3), LP_k(4), LP_k(5), LP_k(6), and LP_k(7) in the tables TBL_1, TBL_2, TBL_3, TBL_4, TBL_5, TBL_6, and TBL_7 are assumed to be SIZE_1 (EN_1), SIZE_2 (EN_2), SIZE_3 (EN_3), SIZE_4 (EN_4), SIZE_5 (EN_5), SIZE_6 (EN_6), and SIZE_7 (EN_7). In this case, the sizes (the numbers of entries) have the following relation.

SIZE_1<SIZE_2<SIZE_3<SIZE_4<SIZE_5<SIZE_6<SIZE_7
EN_1<EN_2<EN_3<EN_4<EN_5<EN_6<EN_7

That is, according to the embodiment, among the sizes of (the numbers of entries in) the leaf pages LP_k(1), LP_k(2), LFP k(3), LP_k(4), LP_k(5), LP_k(6), and LP_k(7) provided in the seven tables TBL_1, TBL_2, TBL_3, TBL_4, TBL_5, TBL_6, and TBL_7, which form the hash table 205, the size of (the number of entries in) the leaf page in the table TBL_1 (that is, the first-stage table TBL_1) is smallest. Then, the size of (the number of entries in) the leaf page increases in the following order: TBL_2, TBL_3, TBL_4, TBL_5, TBL_6, and TBL_7.

Each leaf page LP_k(1) in the table TBL_1 has, for example, 96 entries. Each leaf page LP_k(2) in the table TBL_2 has, for example, 192 entries (that is, double the number of entries in the leaf page LP_k(i)). Each leaf page LP_k(3) in the table TBL_3 has, for example, 384 entries (that is, double the number of entries in the leaf page LP_k(2)). Each leaf page LP_k(4) in the table TBL_4 has, for example, 768 entries (that is, double the number of entries in the leaf page LP_k(3)). Each leaf page LP_k(5) in the table TBL_5 has, for example, 1,536 entries (that is, double the number of entries in the leaf page LP_k(4)). Each leaf page LP_k(6) in the table TBL_6 has, for example, 3,072 entries (that is, double the number of entries in the leaf page LP_k (5)). Each leaf page LP_k(7) in the table TBL_7 has, for example, 6,144 entries (that is, double the number of entries in the leaf page LP_k(6)).

According to the embodiment, the hash table 205 is loaded from the HDD 123 into the table area 122b in the memory 122 in order to speed up access to the hash table 205. However, due to the limited capacity of the table area 122b in the memory 122, not the entire hash table 205 is loaded into the memory 122 but only one leaf page selected from the hash table 205 is loaded into the table area 122b in the memory 122.

The embodiment uses a 32-byte hash value as a hash value for a chunk (4K-byte chunk). The hash generation unit 203 applies, for example, a first hash function referred to as "SHA-256" in order to calculate the 32-byte hash value. The 32-byte hash value is referred to as a first-stage hash value.

Now, it is assumed that a pair of a first-stage hash value and a chunk number for all the chunks stored in the HDD/SSD array 11 are stored in the tables TBL_1 to TBL_7 in a distributed manner without being classified. In this case, an enormous number of pairs of each of a first-stage hash value and a chunk number are stored in the tables TBL_1 to TBL_7. Thus, a long time is needed to search the table TBL_h (h=1, 2, 3, 4, 5, 6, and 7) for, for example, a hash value matching the hash value H(A).

Thus, according to the embodiment, the duplication manager 201 classifies a set of first-stage hash values (that is, 32-byte hash value) to be stored in the tables TBL_1 to TBL_7 into "kmax+1" groups G_0 to G_kmax based on the first-stage hash values. The groups G_0 to G_kmax are associated with group numbers 0 to kmax, respectively. The "kmax+1" leaf pages in each of the tables TBL_1 to TBL_7 are associated with the groups G_0 to G_kmax (that is, the group numbers 0 to kmax). For example, the leaf pages LP_0 (h) to LP_kmax(h) in the table TBL_h are associated with the groups G_0 to G_kmax. Here, kmax is, for example, 16,777,216 (0xFFFFFF in hexadecimal notation). "0x" in 0xFFFFFF indicates that FFFFFF to which "0x" is added is in hexadecimal notation.

To allow the duplication manager 201 to execute the above-described classification, the hash generation unit 203 generates an index serving as a group number for identifying the group to which the first-stage hash value belongs (the index is hereinafter referred to as the group index). The embodiment uses, as the group index, a 3-byte hash value calculated based on the first-stage hash value. The 3-byte hash value is referred to as a second-stage hash value. A second hash function is used to calculate the second-stage hash value (that is, the group index). The second hash function will be described later.

The duplication manager 201 manages a set of first-stage hash values corresponding to the second-stage hash value (group index) 0 (=0x000000), as the group G_0 having the group number 0. Similarly, the duplication manager 201 manages a set of first-stage hash values corresponding to the second-stage hash value 1 (0x000001), as the group G_1 having the group number 1, and manages a set of first-stage hash values corresponding to the second-stage hash value 2 (0x000002), as the group G_2 having the group number 2. Similarly, the duplication manager 201 manages a set of first-stage hash values corresponding to the second-stage hash value kmax (0xFFFFFF), as the group G_kmax having the group number kmax. That is, the duplication manager 201 manages a set of first-stage hash values corresponding to the second-stage hash value k, as the group G_k having the group number k.

Thus, according to the embodiment, the duplication manager 201 uses the second-stage hash values (that is, the group indices) and classifies the set of corresponding first-stage index values into 16,777,216 (that is, "kmax+1" groups. Thus, compared to a case where a set of first-stage index values is not divided into groups, the embodiment can reduce the search range in the hash table 205 to one-16,777,216th.

Now, the second hash function will be described. As described above, the second hash function is used to calculate the second-stage hash value as a group index. The embodiment uses a division function as the second hash function. The division function uses a predetermined prime as a divisor. Specifically, the divisor used is, for example, a prime (16,777,213) which is smaller than the maximum numerical value (16,777,216) expressed using 3 bytes and which is closest to the maximum numerical value. The second-stage hash value is a remainder acquired by dividing the first-stage hash value by the prime 16,777,213 based on the division function (second-stage hash value). Using such a prime as the divisor of the division function allows randomization of a set of first-stage hash values belonging to each of the groups G_0 to G_kmax.

If the second hash function is applied, the total number of second-stage hash values (that is, the total number of group indices) is 16,777,213 (0xFFFFFC). In this case, the second-stage hash values "kmax-2" (=16,777,214), "kmax-1" (=16,777,215), and kmax (=16,777,216) are not present. However, for simplification of management, the duplication manager 201 also manages the groups G_(kmax-2), G_(kmax-1), and G_kmax corresponding to the second-stage hash values "kmax-2", "kmax-1", and kmax according to the embodiment. The groups G (kmax-2), G_(kmax-1), and G_kmax are not necessarily needed.

Now, the data structure of each of the leaf pages in the tables TBL_1 to TBL_7 will be described with examples. FIG. 5 shows an example of the data structure of the kth leaf page LP_k(1) in the table TBL_1 (that is, the first-stage table TBL_1) included in the hash table 205 shown in FIG. 4. The leaf page LP_k(1) is associated with the group G_k.

The leaf page LP_k(1) comprises eight sectors ST_0 to ST_7. As is well known, the sectors are the minimum units for access to a storage drive such as a hard disk drive (HDD) or a solid state drive (SSD). According to the embodiment, one sector is 512 bytes in size. Each of the sectors ST_0 to ST_7 includes 12 entries used to store hash information. Thus, the leaf page LP_k(1) has 96 (8×12=96) entries as described above. Hash information is, for example, 40 bytes in size. The hash information includes a pair of a 32-byte hash value (first-stage hash value) and an 8-byte chunk number. The sectors ST_0 to ST_7 further includes pieces of management information MI1_0 to MI1_7. Each of the pieces of management information MI1_0 to MI1_7 is, for example, 32 bytes in size. The piece of management information MI1_i (i=0, 1, . . . , i(1)max) will be described later. In addition, i(1) max is a number obtained by subtracting 1 from the number of sectors in the leaf page LP_k(1), and is 7.

The data structure of the kth leaf pages LP_k(2) to LP_k(7) in the tables TBL_2 to TBL_7 is similar to the data structure of the leaf page LP_k(1) shown in FIG. 5. However, the numbers of sectors in the leaf pages LP_k(2) to LP_k(7) are different from the number of sectors in the leaf page LP_k(1), as is apparent from the difference in the number of entries described above.

For example, the leaf pages LP_k(2), LP_k(3), and LP_k (4) have 16 sectors (192 entries), 32 sectors (384 entries), and 64 sectors (768 entries), respectively. That is, i(2)max, i(3) max, and i(4)max are 15, 31, and 63, respectively. Furthermore, the leaf pages LP_k(5), LP_k(6), and LP_k(7) have 128 sectors (1,536 entries), 256 sectors (3,072 entries), and 512 sectors (6,144 entries), respectively. That is, i(5)max, i(6) max, and i(7)max are 128, 256, and 512, respectively.

Now, storing of hash information in the hash table 205 with the above-described data structure (that is, the update of the hash table 205) will be described in brief. As described above, the hash table 205 comprises the tables TBL__1 to TBL__7. The table TBL__1 has "kma+1" (that is, 16,777,216) leaf pages LP__0(1) to LP_kmax (I) resulting from classification based on 3-byte second-stage hash values 0x000000 to 0xFFFFFF (that is, group indices).

For example, if a first chunk having the second-stage hash value 0x000000 is written to the HDD/SSD array 11, the duplication manager 201 stores a first piece of management information in the leaf page LP__0(1) in the first-stage table TBL__1 specified by the second-stage hash value 0x000000. The first piece of hash information includes a pair of the first-stage hash value of the first chunk and the chunk number of the first chunk. Similarly, if a second chunk having the second-stage hash value 0x000001 is written to the HDD/SSD array 11, the duplication manager 201 stores a second piece of hash information in the leaf page LP__1(1) in the first table TBL__1 specified by the second-stage hash value 0x000001. The second piece of hash information includes a pair of the first-stage hash value of the second chunk and the chunk number of the second chunk.

The leaf page LP__1(1) (k=0, 1, ..., kmax) in the first-stage table TBL__1 has 96 entries (EN__1=96). Thus, if, for example, 96 chunks having the second-stage hash value 0x00000 have already been written to the HDD/SSD array 11, the leaf page LP__0(1) is full. In this state, for example, the above-described first piece of hash information is precluded from being stored in the leaf page LP__0(1). That is, an additional leaf page is needed.

Thus, according to the embodiment, the hash table 205 further comprises a second-stage table TBL__2 providing an additional leaf page LP_k(2). The leaf page LP_k(2) in the second-stage table TBL__2 is used when the leaf page LP_k(i) in the first-stage table TBL__1 has become full. Thus, the table TBL__1 (that is, the first-stage table TBL__1) is a basic table in the hash table 205.

Now, it is assumed that, with the leaf page LP__0(1) in the first-stage table TBL__1 full, the first chunk (that is, the first chunk having the second-stage hash value 0x000000) is written to the HDD/SSD array 11. In this case, the duplication manager 201 stores the first piece of information in the leaf page LP__0(2) in the second-stage table TBL__2. The leaf page LP_k(2) (k=0, 1, ..., kmax) in the second-stage table TBL__2 has 192 entries (EN__2=192). Therefore, if, for example, the 192 entries in the leaf page LP__0(2) also become full, no new piece of hash information can be stored in the leaf page LP__0(2).

Thus, the hash table 205 further comprises a third-stage table TBL__3 providing an additional leaf page LP_k(3). The leaf page LP_k(3) is used when the leaf page LP_k(2) in the second-stage table TBL__2 has become full. The leaf page LP_k(3) in the third-stage table TBL__3 has 384 entries (EN__3=384). Similarly, the hash table 205 further comprises a fourth-stage table TBL__4 providing an additional leaf page LP_k(4). The leaf page LP_k(4) is used when the leaf page LP_k(3) in the third-stage table TBL__3 has become full. The leaf page LP_k(4) in the fourth-stage table TBL__4 has 768 entries (EN__4=768).

Similarly, the hash table 205 further comprises a fifth-stage table TBL__5 providing an additional leaf page LP_k(5). The leaf page LP_k(5) in the fifth-stage table TBL__5 has 1,536 entries (EN__5=1,536). Likewise, the hash table 205 further comprises a sixth-stage table TBL__6 providing an additional leaf page LP_k(6) and a seventh-stage table TBL__7 providing an additional leaf page LP_k(7). The leaf page LP_k(6) in the sixth-stage table TBL__6 has 3,072 entries (EN__6=3,072), and the leaf page LP_k(7) in the seventh-stage table TBL__7 has 6,144 entries (EN__6=6,144). That is, the hash table 205 has 12,192 entries for each second-stage hash value (that is, each group index).

Now, the significance of the configuration of the hash table 205 as described above will be described. The number of hash values stored in the hash table 205 increases consistently with the amount of data (the number of chunks) stored in the HDD/SSD array 11. In such a situation, the storage capacity needed for the hash table 205 generally exceeds the storage capacity of the memory 122 (for example, the capacity exceeds several gigabytes). Thus, the hash table 205 is stored in the HDD 123 (that is, a local storage device) as in the case of the embodiment. The hash table 205 may be stored in the HDD/SSD array 11.

When the storage capacity needed for the hash table 205 increases, the storage controller 12 (more specifically, the duplication determination unit 202 of the storage controller 12) needs to repeat an operation of loading some of the entries in the hash table 205 into the memory 122 in order to search for a hash value. Thus, many input/output (I/O) processes occur between the storage controller 12 and the storage device.

Common storage systems start operation with a storage capacity (for example, the minimum unit of storage capacity) initially assigned to a logical volume. The logical volume refers to a storage area recognized as a logical storage drive by the host. The storage area (physical area) in the HDD/SSD array 11 is assigned to the logical volume, for example, for every 4 k bytes, as appropriate. A storage system of this kind has a function to flexibly increase the storage capacity of the logical volume according to the situation after the start of operation. This also applies to the storage system 10 according to the embodiment.

For a storage system having such a storage capacity addition function and a duplication elimination function, a hash table having a reference size is prepared at the start of operation. The hash table provided at the start of operation corresponds to a logical volume to which the minimum unit of storage capacity is assigned. Then, if the storage capacity assigned to the logical volume is increased up to the minimum unit multiplied by M (M is an integer of larger than 1), the hash table is also increased in size up to the reference size RS multiplied by M.

According to the embodiment, the minimum unit of storage capacity assignable to the logical volume is 6 terabytes (6 T bytes). The 6 T-byte data is assumed to be divided into 4K-byte chunks as described above.

The duplication manager 201 eliminates storing of a plurality of chunks having the same content (that is, duplicate chunks) in the HDD/SSD array 11 based on the 32-byte hash value of each chunk (first-stage hash value). In this case, the number of chunks stored in the hash table 205 (that is, the number of chunks from which duplication is eliminated) is known not to stochastically exceed 16,777,216×96.

As described above, 16,777,216 is the total number of groups G_0 to G_kmax (group indices) obtained when a set of first-stage hash values is classified based on second-stage hash values. The value 96 is the number of entries (EN__1) in the leaf page LP_k(1) in the table TBL__1 associated with each group G_k (k=0, 1, ..., kmax). Hence, the table TBL__1 is applicable to elimination of duplication from the data in 6 T-byte logical volume. Thus, if the logical volume has a storage capacity of 6 T bytes, the size of the table TBL_1 having 16,777,216×96 entries corresponds to the above-described reference size RS.

If the storage capacity of the logical volume is increased, for example, from 6 T bytes up to 12 T bytes or 24 T bytes, a sufficient number of entries are not provided only by the table TBL_1. In this case, the size of the hash table 205 needs to be increased up to the reference size RS multiplied by two or four. Similarly, if the storage capacity of the logical volume is increased, for example, from 6 T bytes up to 516 T bytes, the size of the hash table 205 needs to be increased up to the reference size RS multiplied by 86.

For this expansion, the conventional technique adds 85 tables having the reference size RS, that is, the second to 86th tables, to the first table (that is, the first table forming the hash table provided at the start of operation). As is apparent, each of the second to 86th tables has the same number of entries as the number of entries in the first table. The first table is used as a first-stage table of a hash table having a multistage configuration. The second to 86th tables are used as a second-stage table to an 86th-stage table of the hash table having the multistage configuration.

In this case, the storage controller needs to sequentially load the first to 86th tables into the memory in order to search the first to 86th tables for a hash value. Thus, even if the memory has a table area for a hash table in which 16,777,216×96 entries are stored, the conventional technique needs 86 I/O processes.

In contrast, the embodiment adds the second-stage table TBL_2 to the seventh-stage table TBL_7 to the first-stage table TBL_1. The second-stage table TBL_2, the third-stage table TBL_3, and the fourth-stage table TBL_4 have twice, four times, and eight times, respectively, as many entries as the entries in the first-stage table TBL_1. Furthermore, the fourth-stage table TBL_4, the fifth-stage table TBL_5, and the sixth-stage table TBL_6 have 16 times, 32 times, and 64 times, respectively, as many entries as the entries in the first-stage table TBL_1.

In this case, the total number of entries in the hash table 205 is 127 times as large as the number of entries in the first-stage table TBL_1 and sufficiently exceeds the total number of entries needed to support a logical volume having a storage capacity of 516 T bytes (that is, the total number of entries that is 86 times as large as the total number of entries in the first-stage table TBL_1). According to the embodiment, to which the hash table 205 configured as described above is applied, the storage controller 12 needs at most seven I/O processes in searching the first-stage table TBL_1 to the seventh-stage table TBL_7 for a hash value.

Hence, the embodiment can sharply reduce the number of I/O processes needed for table access involved in a search for a hash value, compared to the conventional technique. Thus, the embodiment can speed up the search for hash values, enhance the processing ability for duplication elimination, and further improve the write performance (write speed) of the storage system 10.

Furthermore, according to the embodiment, the storage controller 12 need not load the whole of each of the first-stage table TBL_1 to the seventh-stage table TBL_7 into the memory 122 in order to search for a hash value. That is, the storage controller 12 simply needs to load, into the memory 122, the leaf page included in the first-stage table TBL_1 to the seventh-stage table TBL_7 and associated with the second-stage hash value (more specifically, the group identified by the second-stage hash value).

Moreover, according to the embodiment, the leaf page LP_k(7) in the seventh-stage TBL_7 has the largest size. The leaf page LP_k(7) has 6,144 entries. Thus, according to the embodiment, the storage controller 12 simply needs to load a leaf page having at most 6,144 entries from the storage device (more specifically, the HDD 123) into the memory (more specifically, the memory 122) in the above-described I/O processes. In other words, the memory 122 simply needs to have a table area for the hash table 205 in which 6,144 entries are stored.

Hence, the embodiment can sharply reduce the search range of hash values compared to the conventional technique. Thus, the embodiment can further speed up the search for hash values and improve the write performance of the storage system 10.

Figure 6:
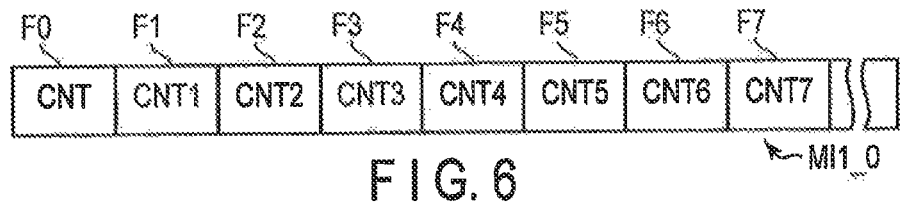
FIG. 6 is a diagram showing an example of a format of management information shown in FIG. 5.

FIG. 6 shows an example of a format of the piece of management information MI1_0 shown in FIG. 5. The piece of management information MI1_0 is stored in the leading sector ST_0 of the leaf page LP_k(1) in the table TBL_1 as described above. The piece of management information MI1_0 includes eight fields F0 to F7. Each of the fields F0 to F7 is 2 bytes in length.

The field F0 of the piece of management information MI1_0 is used to set a use entry count CNT. The use entry count CNT is indicative of the number of entries used to store hash information in the sector ST_0 in which the piece of management information MI1_0 (that is, the piece of management information MI1_0 including the field F0) is stored.

The fields F1 to F7 of the piece of management information MI1_0 are used to set use entry counts CNT1 to CNT7. The use entry counts CNT1 to CNT7 are indicative of the numbers of entries used to store hash information in the leaf pages LP_k(1) to LP_k(7) in the tables TBL_1 to TBL_7.

Figure 7:
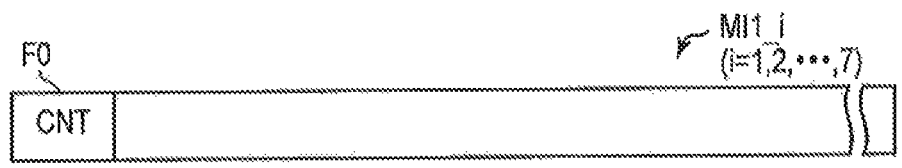
FIG. 7 is a diagram showing an example of a format of other management information shown in FIG. 5.

FIG. 7 is an example of a format of the piece of management information MI1_i (i=1, 2, . . . , 7) shown in FIG. 5. As described above, the piece of management information MI1_i is stored in the sector ST_i (that is, each of the sectors except the sector ST_0) of the leaf page LP_k(1) in the table TBL_11 as described above. The piece of management information MI1_i includes a field F0. The field F0 is 2 bytes in length.

As is the case with the piece of management information MI1_0, the field F0 of the piece of management information MI1_i is used to set the use entry count CNT. The use entry count CNT is indicative of the number of entries used to store hash information in the sector ST_i in which the piece of management information MI1_i is stored. The format of the piece of management information MI1_i shown in FIG. 7 is applied to the management information stored in all the sectors in the leaf pages LP_k(2) to LP_k(7) in the tables TBL_2 to TBL_7.

Figure 8:
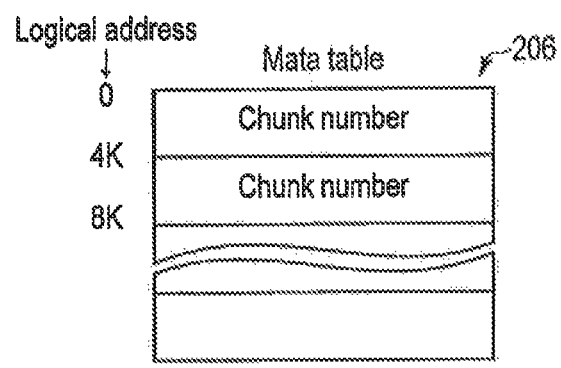
FIG. 8 is a diagram showing an example of a data structure of a meta table shown in FIG. 2.

FIG. 8 shows an example of the data structure of the meta table 206 shown in FIG. 2. The meta table 206 is used to manage chunks written to areas (4K-byte areas) into which the logical volume has been separated. The meta table 206 has a set of entries associated with logical addresses pointing to the respective 4K-byte areas (more specifically, the chunks stored in the 4K-byte areas) of the logical volume.

Each of the entries in the meta table 206 is used to store the chunk number of the chunk stored in the 4K-byte area indicated by the logical address associated with the entry. That is, in order to indicate the chunk written to each 4K-byte area, the meta table 206 associates the logical address of the 4K-byte area with the chunk number assigned to the chunk. Thus, the duplication manager 201 can identify the chunk stored in the area specified by the intended logical address with reference to the meta table 206.

Figure 9:
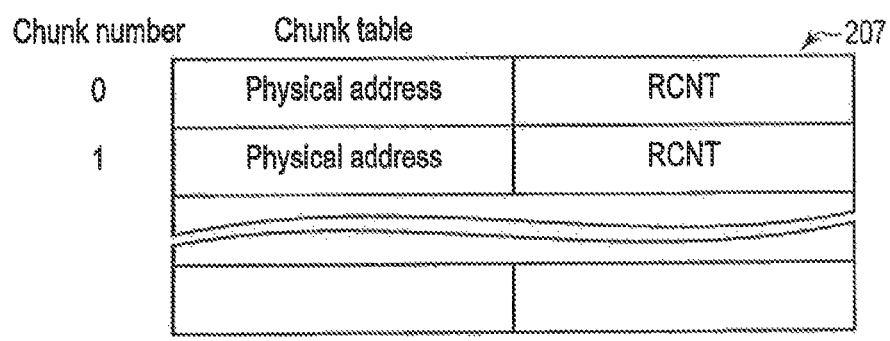
FIG. 9 is a diagram showing an example of a data structure of a chunk table shown in FIG. 2.

FIG. 9 shows an example of the data structure of the chunk table 207 shown in FIG. 2. The chunk table 207 has a set of entries associated with chunk numbers. Each of the entries in the chunk table 207 is used to store chunk information on the chunk having the chunk number associated with the entry. The chunk information includes a physical address and a reference count RCNT.

Each of the entries in the chunk table 207 has a physical address field and a reference count field. The physical address field is used to store a physical address pointing to the physical position of the chunk having the chunk number associated with the entry having the physical address field (hereinafter referred to as the corresponding entry). The physical position of the chunk is indicative of the position of a storage area in the HDD/SSD array 11 in which the chunk is actually stored.

The reference count field is used to store the reference count RCNT. The reference count RCNT indicates how many logical addresses (4K-byte areas) are associated with the chunk identified by the chunk number associated with the corresponding entry (this chunk is hereinafter referred to as the corresponding chunk).

For example, a reference count RCNT of "1" indicates that the corresponding chunk has been written to the HDD/SSD array 11 without being subjected to duplication elimination. In other words, the reference count RCNT indicates that the corresponding chunk has been written only to the 4K-byte area pointed to by one logical address in the logical volume. In contrast, a reference count RCN of, for example, "2" indicates that, as a result of duplication elimination, one substantial chunk has been written to the HDD/SSD array 11 but is associated with two logical addresses. In other words, the host 20 has written chunks having the same content to the respective 4K-byte areas pointed by the two logical addresses in the logical volume.

Now, operation of the embodiment will be described with reference to FIG. 10 to FIG. 12. FIG. 10 is a diagram showing a part of a flowchart illustrating an exemplary procedure for a data write process. The data write process is executed when the storage controller 12 of the storage system 10 receives a data write request from the host 20. FIG. 11 is a diagram showing another part of the flowchart illustrating the exemplary procedure for the data write process. FIG. 12 is a diagram showing the remaining part of the flowchart illustrating the exemplary procedure for the data write process.

Now, it is assumed that the host 20 transmits a data write request specifying file write (that is, a file write request) to the storage system 10 via the network 30. It is further assumed that the storage controller 12 of the storage system 10 receives the file write request from the host 20.

Then, the dividing unit 200 of the storage controller 12 separates the file specified in the file write request (that is, file data) into, for example, 4K-byte data. Thus, the dividing unit 200 divides the specified file into a plurality of chunks each having a size of 4K bytes (step S1). That is, the duplication manager 201 acquires, from the specified file, a plurality of chunks forming the file. If the specified file has a size of 4K bytes, the dividing unit 200 acquires the file itself as one chunk. The size of the chunk need not be a fixed length. That is, the size of the chunk may be a variable length.

The duplication manager 201 sets the number of acquired chunks to a variable N (step S2). The N chunks acquired are represented as chunks C_1 to C_N.

The hash generation unit 203 calculates hash values (that is, first-stage hash values) H1 (C_1) to H1 (C_N) for the chunks C_1 to C_N using, for example, a first hash function referred to as "SHA-256" (step S3). Each of the first-stage hash values H1(C_1) to H1(C_N) is expressed using 32 bytes.

Then, the hash generation unit 203 calculates the hash values (that is, second-stage hash values) H2 (C_1) to H2 (C_N) of the first-stage hash values H1(C_1) to H1(C_N) using a second hash function (step S4). As described above, the second hash function is a division function using 16,777,213 as a divisor. That is, the hash generation unit 203 determines the remainders of the division of the first-stage hash values H1(C_1) to H1(C_N) by the prime 16,777,213 to be the second-stage hash values H2(C_) to H2(C_N).

Then, the duplication manager 201 sets a variable n used to specify one of the N chunks acquired in step S1 to an initial value of 1 (step S5). The duplication manager 201 selects the nth chunk C_n from the N chunks C_1 to C_N acquired in step S1 (step S6).

Then, the duplication determination unit 202 executes a hash value search process for searching the hash table 205 for a first-stage hash value matching the first-stage hash value H1(C_n) of the chunk C_n selected by the duplication manager 201 (step S7). In the hash value search process, the duplication determination unit 202 sequentially compares the first-stage hash value H1(C_n) with first-stage hash values which belong to the group associated with the second-stage hash value H2(C_n) of the chunk C_n calculated in step S4 and which are stored in the hash table 205. The comparison allows the duplication determination unit 202 to search for the first-stage hash value matching the first-stage hash value H1(C_n). The hash value search process will be described later in detail.

Based on the result of the hash value search process, the duplication determination unit 202 determines whether any first-stage hash value matching the first-stage hash value H1(C_n) of the selected chunk C_n is present in the hash table 205 (step S8). Based on the result of the determination, the duplication manager 201 proceeds to step S9 or step S16.

If no first-stage hash value is present which matches the first-stage hash value H1(C_n) of the selected chunk C_n (No in step S8), the duplication manager 201 determines that no chunk having the same content as the content of the chunk C_n is stored in the HDD/SSD array 11. In this case, the duplication manager 201 proceeds to step S9.

In step S9, the duplication manager 201 imparts the chunk number CNC_n to the chunk C_n. According to the embodiment, the chunk numbers imparted are sequential. The chunk number CNC_n imparted to the chunk C_n in step S9 is obtained by adding 1 to the latest chunk number already imparted to another chunk. Thus, for example, the HDD 123 stores the latest chunk number (or the next chunk number to be imparted). The latest chunk number is loaded from the HDD 123 into the work area 122c in the memory 122 for use.

The duplication manager 201 can also acquire the latest chunk number by sequentially referencing the entries in the chunk table 207 starting with the leading entry. Alternatively, the duplication manager 201 may use a next entry pointer pointing to an entry in the chunk table 207 which is associated with the next chunk number to be imparted. The duplication manager 201 can determine the chunk number CNC_n imparted to the chunk C_n based on the next entry pointer.

When the chunk number CNC_n is imparted to the chunk C_n, the access controller 204 writes the chunk C_n to a free storage area in the storage device (more specifically, the HDD/SSD array 11 in the storage device) (step S10). Then, the duplication manager 201 stores the hash information HIC_n on the chunk C_n in the leaf page LP_k(h) in the hash table 205 associated with the second-stage hash value H2(C_n) of the chunk C_n (step S11). The hash information HIC_n includes a pair of the first-stage hash value H1(C_n) of the chunk C_n and the chunk number of the chunk C_n.

As described later, LP_k(h) denotes the leaf page searched last for a hash value during the hash value search process (step S7). In this case, k in LP_k(h) represents the second-stage hash value H2(C_n), used as a group index. Furthermore, h in LP_k(h) indicates that the leaf page LP_k(h) is included in the hth-stage table TBL_h. That is, LP_k(h) denotes the kth leaf page included in the hth-stage table TBL_(h).

Step S11 will be described below in detail. First, it is assumed that the sector and the entry in the sector in the leaf page LP_k(h) searched last for a hash value are the ith sector ST_i in the leaf page LP_k(h) and the jth entry in the ith sector ST_i, respectively. In this case, the duplication determination unit 202 stores the hash information HIC_n on the chunk C_n in the j+1th entry in the ith sector ST_i in the leaf page LP_k(h).

Furthermore, the duplication manager 201 increments the use entry counter CNT in the management information included in the sector ST_i by 1. Moreover, the duplication manager 201 increments, by 1, the use entry count CNTh in the piece of management information MI1_0 included in the leading sector ST_0 in the leaf page LP_k(1). The piece of management information MI1_0 is stored not only in the leading sector ST_0 in the leaf page LP_k(1) but also in the work area 12c as described later.

The present embodiment increments the use entry count CNTn in the piece of management information MI1_0 stored in the work area 122c. The piece of management information MI1_0 stored in the work area 122c is, for example, overwritten, at an appropriate timing, to the piece of management information MI1_0 in the leading sector ST_0 in the leaf page LP_k(1) stored in the HDD 123. The appropriate timing refers to, for example, a timing while the storage system 10 is not busy or before the storage system 10 is powered off.

It is also assumed that the jth entry in the ith sector ST_i is the final entry in the ith sector (here, i=11). In this case, the duplication determination unit 202 stores the hash information HIC_n on the chunk C_n in the leading entry in the "i+1"th sector ST_(i+1) in the leaf page LP_k(h).

Furthermore, the duplication manager 201 increments the use entry count CNT in the management information included in the sector ST_(i+1) by 1. Moreover, the duplication manager 201 increments the use entry count CNTh in the piece of management information MI1_0 by 1.

Then, the entry in the leaf page LP_k(h) searched last for a hash value is assumed to be the final entry in the leaf page LP_k(h) (more specifically, the final entry in the final sector in the leaf page LP_k(h)). That is, it is assumed that all the entries in the leaf page LP_k(h) are in use and thus no free entry is present in the leaf page LP_k(h). In this case, unlike in the above description, the duplication manager 201 stores the hash information HIC_n on the chunk C_n in the leading sector ST_0 (more specifically, the leading entry in the leading sector ST_0 in the leaf page LP_k(h+1)) in the kth leaf page LP_k(h+1) included in the "h+1"th-stage table TBL_(h+1).

Furthermore, the duplication manager 201 increments, by 1, the use entry count CNT in the management information included in the leading sector ST_0 in the leaf page LP_k(h+1). Moreover, the duplication manager 201 increments the use entry count CNT(h+1) in the piece of management information MI1_0 by 1.

Upon executing step S11, the duplication manager 201 proceeds to step S12. In step S12, the duplication manager 201 acquires a logical address indicative of the position of the selected chunk C_n in the logical volume. The logical address is acquired by adding 4K (that is, 4,096)×(n−1) to the logical address specified in the file write request from the host 20 (the leading address of the file). In step S12, the duplication manager 201 further stores the chunk number CNC_n imparted to the selected chunk C_n in the entry in the meta table 206 associated with the acquired logical address.

Upon executing step S12, the duplication manager 201 proceeds to step S13. In step S13, the duplication manager 201 selects the entry in the chunk table 207 first associated with the chunk number CNC_n imparted to the selected C_n. In step S13, the duplication manager 201 further stores chunk information CIC_n on the selected chunk C_n in the selected entry. The chunk information CIC_n includes the physical address of a storage area in the HDD/SSD array 11 to which the selected chunk C_n has been written as well as the reference count RCN. The reference count RCN has a value of "1".

Upon executing step S13, the duplication manager 201 proceeds to step S14. In step 314, the duplication manager 201 increments the variable n by 1. The duplication manager 201 determines whether the incremented variable n exceeds the number N of chunks set in step S2 (step S15). If the incremented variable n does not exceed the number N of chunks (No in step S15), the duplication manager 201 returns to step S6 in order to process write of the next chunk included in the file specified in the file write request from the host 20. In contrast, if the incremented variable n exceeds the number N of chunks (Yes in step S15), the duplication manager 201 determines that write of all the chunks, included in the file specified in the file write request from the host 20, has been ended. In this case, the data write process shown in the flowchart in FIGS. 10 to 12 ends.

Now, an operation will be described which is performed when the duplication manager 201 determines in step S8 that a first-stage hash value matching the first-stage hash value H1(C_n) of the selected chunk C_n is present. If the determination in step S8 is thus "Yes", the duplication manager 201 determines that a chunk having the same content as the content of the selected chunk C_n has already been stored in the HDD/SSD array 11. In this case, the chunk already stored in the HDD/SSD array 11 and having the same content as the content of the chunk C_n is represented as the chunk C_x.

If the determination in step S8 is "Yes", the duplication manager 201 proceeds to step S16 in order to eliminate the duplicate storing of a plurality of chunks having the same content in the HDD/SSD array 11.

In step S16, the duplication manager 201 inhibits the access controller 204 from performing an operation of writing the selected chunk C_n to the HDD/SSD array 11.

Then, the duplication manager 201 stores the chunk number of the chunk C_x in the meta table 206 as the chunk number CNC_n of the selected chunk C_n (step S17). Thus, in the meta table 206, the same chunk number is stored in at least two entries in the meta table 206. To identify the entry in the meta table 206 in which the chunk number is to be stored, the duplication manager 201 acquires a logical address indicative of the position of the selected channel C_n in the logical volume as is the case with step S12.

Upon executing step S17, the duplication manager 201 proceeds to step S18. In step S18, first, the duplication manager 201 references chunk information CIC_n stored in the entry in the chunk table 207 associated with the chunk number of the selected chunk C_n (that is, the chunk number of the chunk C_x). In step S18, the duplication manager 201 further increments the reference count RCNT in the referenced chunk information CIC_n by 1. Thus, the incremented reference count RCNT indicates that one substantial chunk has been written to the HDD/SSD array 11 but that RCNT chunks having the same content as the content of the one chunk have been written to RCNT 4K-byte areas in the logical volume.

Upon executing step S18, the duplication manager 201 proceeds to step S19. In step 319, first, the duplication manager 201 acquires a physical address pointing to a storage area in the HDD/SSD array 11 to which the chunk C_x (that is, the chunk C_x having the same content as the content of the selected chunk C_n) has been written. The physical address is included in the chunk information referenced in step S18. In step S19, the duplication manager 201 further assigns the acquired physical address to the logical address of the selected chunk C_n. Specifically, the duplication manager 201 stores address translation information (that is, mapping information) indicative of the correspondence between the logical address of the selected chunk C_n and the acquired physical address, in an address translation table (not shown in the drawings). Upon executing step S19, the duplication manager 201 proceeds to step S14. The subsequent operation is similar to the operation performed when the duplication manager 201 proceeds from step S13 to step S14.

Step S19 is not necessarily needed. For example, the duplication manager 201 can translate the logical address specified by the host 20 into a physical address without using the address translation table. First, the duplication manager 201 references the meta table 206 based on the logical address specified by the host 20 and thus acquires the chunk number stored in the entry associated with the logical address. Then, the duplication manager 201 references the chunk table 207 based on the acquired chunk number to acquire the physical address stored in the entry associated with the chunk.

Figure 13:
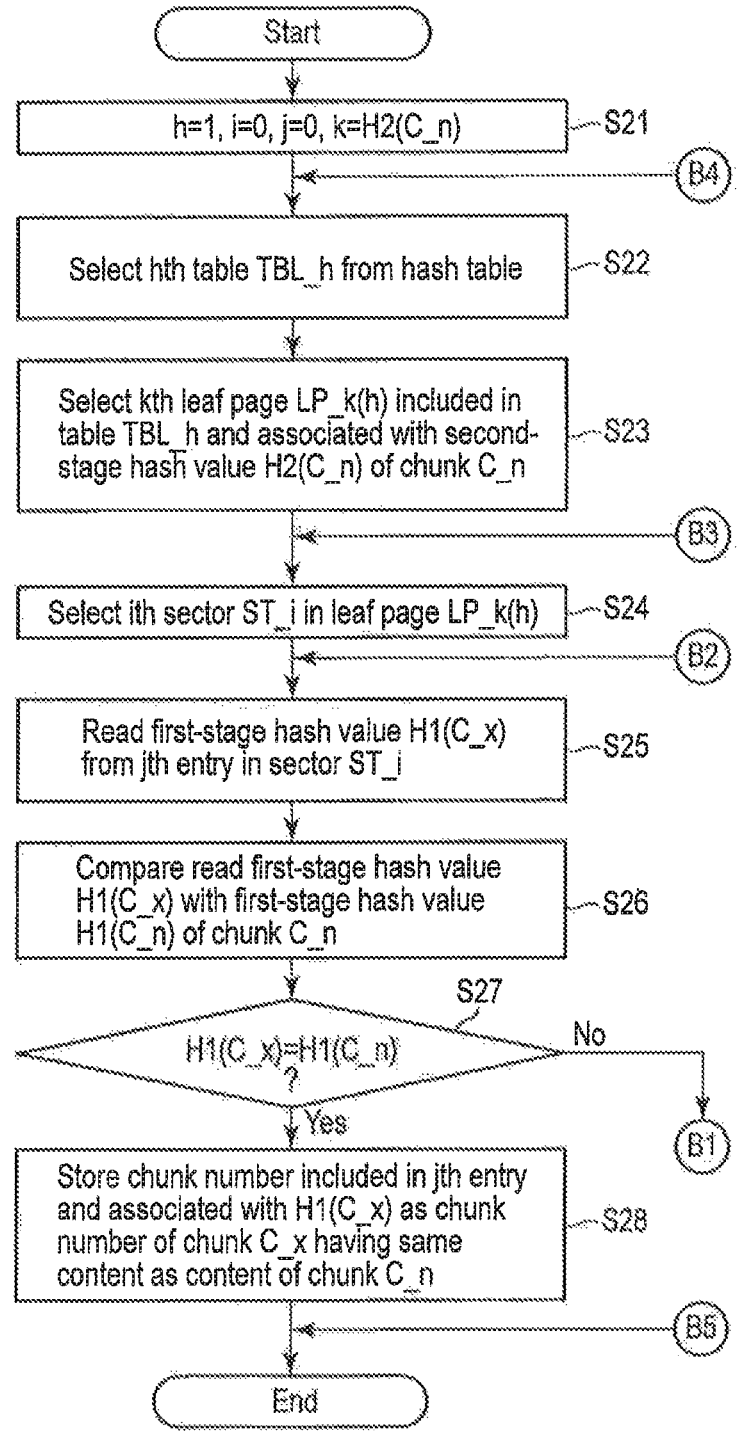
FIG. 13 is a diagram showing a part of a flowchart illustrating an exemplary procedure for a hash value search process according to the embodiment.
Figure 14:
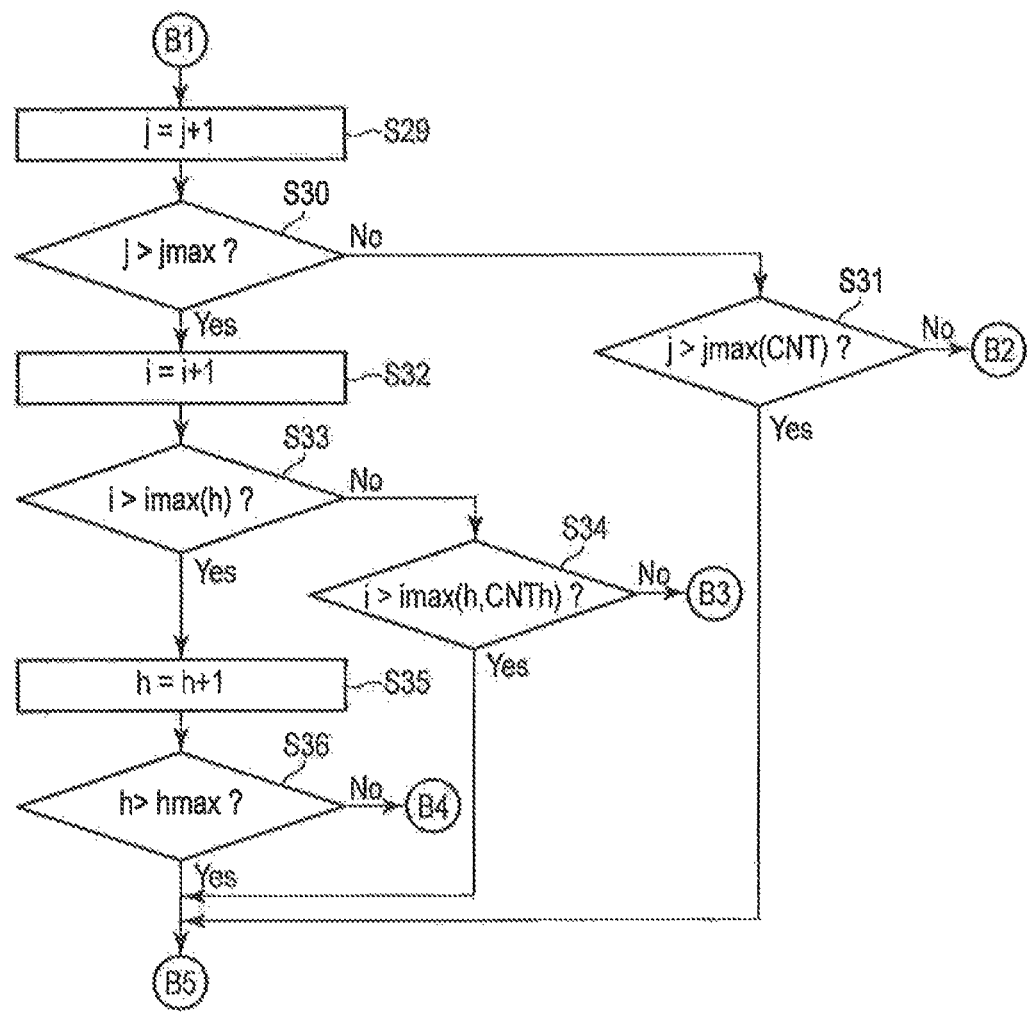
FIG. 14 is a diagram showing the remaining part of the flowchart illustrating the exemplary procedure for the hash value search process.

Now, the hash value search process (step S7) according to the embodiment will be described in detail with reference to FIG. 13 and FIG. 14. FIG. 13 is a diagram showing a part of a flowchart illustrating an exemplary procedure for the hash value search process. FIG. 14 is a diagram showing the remaining part of the flowchart illustrating the exemplary procedure for the hash value search process.

First, the duplication manager 201 sets a variable h to an initial value of I (step S21). The variable h is indicative of the hth-stage table TBL_h in the hash table 205. In step S21, the duplication determination unit 202 further sets a variable k to the second-stage hash value H2(C_n) of the selected chunk C_n. The variable k is indicative of the kth leaf page LP_k(h) included in the table TBL_h and associated with the second-stage hash value H2(C_n) of the selected chunk C_n. In step S21, the duplication determination unit 202 further sets both variables i and j to an initial value of 0. The variable i is indicative of the ith sector ST_i included in the leaf page LP_k(h) identified based on the variables h and k. The variable j is indicative of the jth entry in the sector ST_i.

Then, the duplication determination unit 202 selects the hth-stage table TBL_h from the hash table 205 (step S22). In the embodiment, in which the variable h is 1, the first-stage table TBL_1 is selected as the table TBL_h. The duplication determination unit 202 then selects the kth leaf page LP_k(h) included in the selected table TBL_h and associated with the second-stage hash value H2(C_n)=k of the selected chunk C_n (step S23). In this case, since h is 1, the kth leaf page LP_k(1) in the table TBL_1 is selected as the leaf page LP_k(h). In step S23, the duplication determination unit 202 reads the selected leaf page LP_k(h) from the HDD 123 and stores the read leaf page LP_k(h) in the table area 122b in the memory 122. That is, the duplication determination unit 202 loads the selected leaf page LP_k(h) in the table area 122b of the memory 122.

Then, the duplication determination unit 202 selects the ith sector ST_i in the selected (loaded) leaf page LP_k(n) (in this case, the leaf page LP_k(1)) (step S24). In this case, the leading (0th) sector ST_0 is selected as the ith sector ST_i.

Upon selecting the leading sector ST_0 in the leaf page LP_k(1) (that is, the leaf page LP_k(1) stored in the table area 122b of the memory 122), the duplication determination unit 202 also stores the piece of management information MI1_0 included in the sector ST_0, for example, in the work area 122c of the memory 122. Thus, the duplication determination unit 202 can acquire the number of entries in use in each of the leaf pages LP_k(2) to LP_k(7) in the tables TBL_2 to TBL_7 simply by referencing the use entry counts CNT2 to CNT7 in the piece of management information MI1_0.

That is, the duplication determination unit 202 can acquire the number of entries in use in each of the leaf pages LP_k(2) to LP_k(7) before reading the leaf pages LP_k(2) to LP_k(7) from the HDD 123. The duplication determination unit 202 can also acquire the number of entries in use in the leaf page LP_k(1) based on the use entry count CNT1 in the piece of management information MI1_0.

Hence, the duplication determination unit 202 can identify a leaf page having no entries in use therein based on the number of entries in use in each of the leaf pages LP_k(1) to LP_k(7) (that is, the use entry counts CNT1 to CNT7 in the piece of management information MI1_0). It is assumed that each of the use entry counts CNT1 to CNT3 is non-zero and that each of the use entry counts CNT5 to CNT7 is zero. In this case, the duplication determination unit 202 can determine that the hash value search may be executed at most on the leaf pages LP_k(1) to LP_k(4). The maximum search range for the leaf pages is represented as hmax.

In this example, hmax is four, and thus, four leaf pages starting from the leaf page LP_k(1) correspond to the maximum search range.

Similarly, the duplication determination unit 202 can determine the number of sectors in use in the leaf page LP_k(h) based on the use entry count CNTh (h=1, 2, . . . , 7) in the piece of management information MI1_0. For example, the number of entries in each of the sectors in the leaf page LP_k(1) (h=1) is 12. Thus, if the use entry count CNT1 (h=1) is, for example, 16, the duplication determination unit 202 can determine the number of sectors in use in the leaf page LP_k (1) to be 2. In this case, the duplication determination unit 202 can determine that the hash value search may be executed at most on the sectors ST_0 and ST_11 in the leaf page LP_k (1). The maximum search range for the sectors is represented as imax (h, CNT1). The value imax (h, CNT1) is obtained by subtracting 1 from the number of sectors in use in the leaf page LP_k(h).

Upon executing step S24, the duplication determination unit 202 proceeds to step S25. In step S25, the duplication determination unit 202 reads the first-stage hash value H1(C_x) from the jth entry in the selected sector ST_i. The duplication determination unit 202 then compares the read first-stage hash value H1(C_x) with the first-stage hash value H1(C_n) of the chunk C_n calculated in step S1 (step S26). The duplication determination unit 202 then determines whether the first-stage hash value H1(C_x) matches the first-stage hash value H1(C_n) (step S27).

If the determination in step S27 is "Yes", the duplication determination unit 202 acquires a chunk number included in the jth entry in the sector ST_i and paired with the first-stage hash value H1(C_x) (step S28). In step S28, the duplication determination unit 202 temporarily stores the acquired chunk number, for example, in the work area 122c of the memory 122 as the chunk number of the chunk C_x having the same content as the content of the selected chunk C_n. Thus, the hash value search process (step S7) ends, and the duplication determination unit 202 proceeds to step S8. The chunk number of the chunk C_x temporarily stored in the work area 122c is used in step S17.

On the other hand, if the determination in step S27 is "No", the duplication determination unit 202 proceeds to step S29 in order to acquire the next first-stage hash value to be compared with the first-stage hash value H1(C_n). In step S29, the duplication determination unit 202 increments the variable j by one. The duplication determination unit 202 then determines whether the incremented variable j exceeds the maximum value jmax of the variable j (step S30). According to the embodiment, the maximum value jmax of the variable j is 11.

If the determination in step S30 is "No", the duplication determination unit 202 proceeds to step S31. In step S31, the duplication determination unit 202 determines whether the variable j exceeds jmax(CNT). The value jmax(CNT) is obtained by subtracting 1 from the use entry count CNT in the piece of management information MIh_i included in the sector ST_i in the leaf page LP_k(h) (that is, jmax(CNT) is "CNT-1"). That is, jmax(CNT) is indicative of the maximum search range for the entries in the sector ST_i in the leaf page LP_k(h).

If the variable j exceeds jmax(CNT) (that is, "CNT-1") (Yes in step S31), the duplication determination unit 202 determines that no new first-stage hash value to be compared with the first-stage hash value H1(C_n) is present in the hash table 205 and that the first-stage hash value H1(C_n) thus matches none of the first-stage hash values stored in the hash table 205. In this case, the duplication determination unit 202 ends the hash value search process. In contrast, if the variable j does not exceed jmax(CNT) (No in step S31), the duplication determination unit 202 returns to step S25 in order to read a first-stage hash value from the next entry in the sector ST_i in the leaf page LP_k(h).

On the other hand, if the determination in step S30 is "Yes", the duplication determination unit 202 increments the variable i by 1 (step S32). The duplication determination unit 202 determines whether the incremented variable i exceeds the maximum value imax(h) of the variable i (step S33). The maximum value imax(h) of the variable i is 7 (8−1=7) if the variable h is, for example, 1, and is 15 (16−1) if the variable h is, for example, 2.

If the determination in step S33 is "No", the duplication determination unit 202 proceeds to step S34. In step S34, the duplication determination unit 202 determines whether the variable i exceeds imax(h, CNTh). As described above, imax (h, CNTh) is a value obtained by subtracting 1 from the number of sectors in use in the leaf page LP_k(h).

If the variable i exceeds imax(h, CNTh) (Yes in step S34), the duplication determination unit 202 determines that no new first-stage hash value to be compared with the first-stage hash value H1(C_n) is present in the hash table 205 and that the first-stage hash value H1(C_n) thus matches none of the first-stage hash values stored in the hash table 205. In this case, the duplication determination unit 202 ends the hash value search process. In contrast, if the variable j does not exceed imax(h, CNT) (No in step S34), the duplication determination unit 202 returns to step S24 in order to select the next sector in the leaf page LP_k(h) (in this case, LP_k(1)).

On the other hand, if the determination in step S33 is "Yes", the duplication determination unit 202 increments the variable h by 1 (step S35). The duplication determination unit 202 then determines whether the incremented variable h exceeds hmax (step S36). As described above, hmax is determined based on the use entry counts CNT1 to CNT7 in the piece of management information MI1_0 included in the leading sector ST_0 in the leaf page LP_k(1).

If the determination in step S36 is "No", the duplication determination unit 202 returns to step S22 in order to select the next table from the hash table 205 and the next leaf page from the selected next table. In contrast, if the determination in step S36 is "Yes", the duplication determination unit 202 determines that no new first-stage hash value to be compared with the first-stage hash value H1(C_n) is present in the hash table 205 and that the first-stage hash value H1(C_n) thus matches none of the first-stage hash values stored in the hash table 205. In this case, the duplication determination unit 202 ends the hash value search process.

Figure 15A:
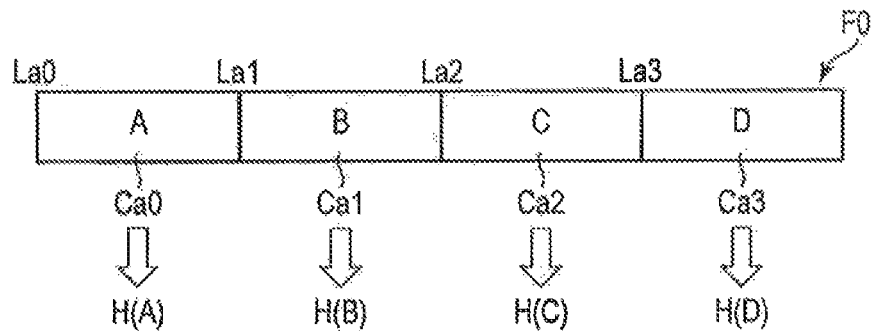
FIGS. 15A, 15B, and 15C are diagrams showing an example of relations between three files specified in three write requests sequentially transmitted by a host computer and chunks acquired by separating each of the three files into data each of a given size.
Figure 15B:
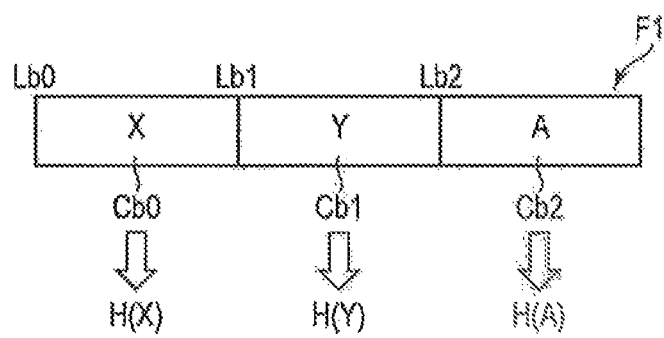
Figure 15C:
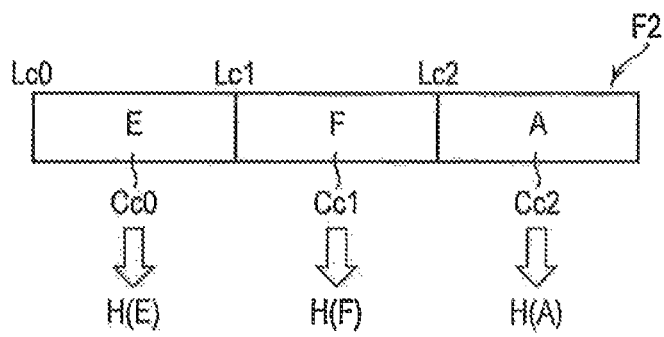

Now, an example of file write requested by the host 20 will be described with reference to FIGS. 15A, 15B, 15C, 16A, 16B, 16C, 16D, 17A, 17B, 17C, 17D, 18A, 18B, 18C, and 18D. FIGS. 15A, 15B, and 15C show an example of the relations between files F0, F1, and F2 specified in three file write requests sequentially transmitted by the host 20 and chunks acquired by separating the files F0, F1, and F2 into 4K-byte data. FIGS. 16A, 16B, 16C, and 16D show an example of changes in the contents of, for example, the first-stage table TBL_1 included in the hash table 205. FIGS. 17A, 17B, 17C, and 17D show an example of changes in the contents of the meta table 206. FIGS. 18A, 18B, 18C, and 18D show an example of changes in the contents of the chunk table 207.

First, it is assumed that after the operation of the storage system 10 is started, the host 20 requests the storage controller 12 in the storage system 10 to write the 16-K byte file F0 shown in FIG. 15A to an area in the logical volume which starts from a logical address La0. In this case, the dividing unit 200 of the storage controller 12 divides the file F0 into four chunks: Ca0, Ca1, Ca2, and Ca3. The logical addresses La1, La2, and La3 to which the chunks Ca1, Ca2, and Ca3 are written are La0+4K, La0+8K, and La0+12K, respectively. The chunks Ca0, Ca1, Ca2, and Ca3 have data A, B, C, and D, respectively. The hash generation unit 203 calculates hash values (first-stage hash values) H(A), H(B), H(C), and H(D) for the chunks Ca0, Ca1, Ca2, and Ca3.

It is assumed that the chunks other than the chunks Ca0, Ca1, Ca2, and Ca3 all have contents different from the contents of the chunks Ca0, Ca1, Ca2, and Ca3. In this case, the access controller 204 writes the chunks Ca0, Ca1, Ca2, and Ca3 to a free area in the HDD/SSD array 11, for example, a physical area specified by physical addresses Pa0, Pa1, Pa2, and Pa3. Furthermore, the duplication manager 201 imparts, for example, chunk numbers 0, 1, 2, and 3 to the chunks Ca0, Ca1, Ca2, and Ca3.

Figure 16A:
FIGS. 16A, 16B, 16C, and 16D are diagrams showing an example of a variation in the contents of the first-stage table included in the hash table.

The duplication determination unit 202 stores pairs of the first-stage hash values H(A), H(B), H(C), and H(D) and the corresponding chunk numbers 0, 1, 2, and 3, in the table TBL_1, for example, as shown in FIG. 16A. Although not shown in FIG. 16A, these pairs are stored in leaf pages in the table TBL_1 associated with the respective second-stage hash values of the hash values H(A), H(B), H(C), and H(D).

Figures 17A, 17B, 17C, 17D:
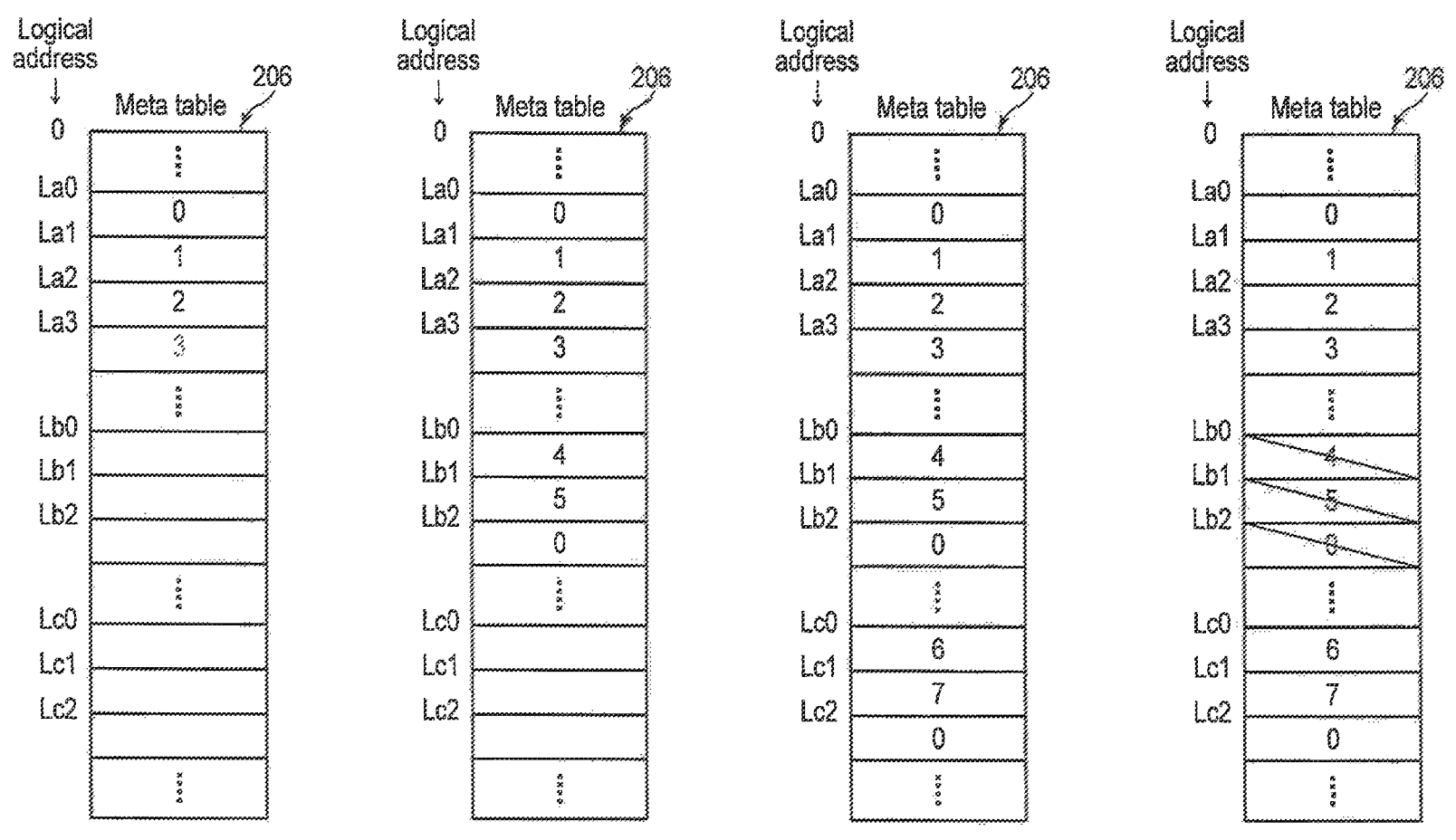

Furthermore, the duplication manager 201 stores the chunk numbers 0, 1, 2, and 3 of the chunks Ca0, Ca1, Ca2, and Ca3 in respective entries in the meta table 206 associated with the logical addresses La0, La1, La2, and La3 as shown in FIG. 17A. The duplication manager 201 further stores the physical addresses Pa0, Pa1, Pa2, and Pa3 of physical areas to which the chunks Ca0, Ca1, Ca2, and Ca3 have been written, in respective entries in the chunk table 207 associated with the chunk numbers 0, 1, 2, and 3 of the chunks Ca0, Ca1, Ca2, and Ca3 as shown in FIG. 18A. In the chunk table 207, the duplication manager 201 further sets 1 for each of the reference counts RCNT paired with the physical addresses Pa1, Pa1, Pa2, and Pa3.

Now, it is assumed that the host 20 requests the storage controller 12 to write the 12K-byte file F1 shown in FIG. 15B to an area in the logical volume which starts from a logical address Lb0. In this case, the dividing unit 200 of the storage controller 12 divides the file F1 into three chunks: Cb0, Cb1, and Cb2. Logical addresses Lb1 and Lb2 to which the chunks Cb1 and Cb2 are to be written are Lb0+4K and Lb0+8K, respectively. The chunks Cb0, Cb1, and Cb2 have data X, Y, and A, respectively. The hash generation unit 203 calculates hash values (first-stage hash values) H(X), H(Y), and H(A) for the chunks Cb0, Cb1, and Cb2.

In this case, the chunks other than the chunks Cb0 and Cb1 all have contents different from the contents of the chunks Cb0 and Cb1, but the chunk Ca0 has the same content (A) as the content of the chunk Cb2. In this case, the access controller 204 writes the chunks Cb0 and Cb1 to free areas in the HDD/SSD array 11, for example, physical areas specified by the addresses Pb0 and Pb1. On the other hand, in order to eliminate the duplication between the chunk Cb2 and the chunk Ca0, the duplication manager 201 inhibits the access controller 204 from writing the chunk Cb2 to the HDD/SSD array 11. The duplication manager 201 further imparts chunk numbers 4 and 5 succeeding the latest chunk number 3 to the chunks Cb0 and Cb1. Furthermore, the chunk number 0 of the chunk Ca0 is used as the chunk number of the chunk Cb2 having the same content (A) as the content of the chunk Ca0.

Figure 16B:

The duplication manager 201 stores pairs of the first-stage hash values H(X) and H(Y) and the corresponding chunk numbers 4 and 5 in the table TBL__1, for example, as shown in FIG. 16B. The duplication manager 201 further stores the chunk numbers 4, 5, and 0 of the chunks Cb0, Cb1, and Cb2 in respective entries in the meta table 206 associated with the logical addresses Lb0, Lb1, and Lb2 as shown in FIG. 17B.

Furthermore, the duplication manager 201 stores the physical addresses Pb0 and Pb1 of physical areas to which the chunks Cb0 and Cb1 have been written, in respective entries in the chunk table 207 associated with the chunk numbers 4 and 5 of the chunks Cb0 and Cb1 as shown in FIG. 18B. In the chunk table 207, the duplication manager 201 further sets 1 for each of the reference counts RCNT paired with the physical addresses Pb0 and Pb1. The duplication manager 201 further updates the reference count RCNT in an entry in the chunk table 207 associated with the chunk number 0 of the chunk Ca0 having the same content (A) as the content of the chunk Cb2, from 1 shown in FIG. 18A to 2 shown in FIG. 18B.

Now, it is assumed that the host 20 requests the storage controller 12 to write the 12K-byte file F2 shown in FIG. 15C to an area in the logical volume which starts from a logical address Lc0. In this case, the dividing unit 200 of the storage controller 12 divides the file F2 into three chunks Cc0, Cc1, and Cc2. Logical addresses Lc1 and Lc2 to which the chunks Cc1 and Cc2 are to be written are Lc0+4K and Lc0+8K, respectively. The chunks Cc0, Cc1, and Cc2 have data E, F, and A, respectively. The hash generation unit 203 calculates hash values (first-stage hash values) H(E), H(F), and H(A) for the chunks Cc0, Cc1, and Cc2.

In this case, the chunks other than the chunks Cc0 and Cc1 all have contents different from the contents of the chunks Cc0 and Cc1, but the chunk Ca0 has the same content (A) as the content of the chunk Cc2. In this case, the access controller 204 writes the chunks Cc0 and Cc1 to free areas in the HDD/SSD array 11, for example, physical areas specified by the addresses Pc0 and Pc1. On the other hand, in order to eliminate the duplication between the chunk Cc2 and the chunk Ca0, the duplication manager 201 inhibits the access controller 204 from writing the chunk Cc2 to the HDD/SSD array 11. The duplication manager 201 further imparts chunk numbers 6 and 7 succeeding the latest chunk number 5 to the chunks Cc0 and Cc1. Furthermore, the chunk number 0 of the chunk Ca0 is used as the chunk number of the chunk Cc2 having the same content (A) as the content of the chunk Ca0.

Figure 16C:
Figure 16D:

The duplication manager 201 stores pairs of the first-stage hash values H(E) and H(Y) and the corresponding chunk numbers 6 and 7 in the table TBL__1, for example, as shown in FIG. 16C. The duplication manager 201 further stores the chunk numbers 6, 7, and 0 of the chunks Cc0, Cc1, and Cc2 in respective entries in the meta table 206 associated with the logical addresses Lc0, Lc1, and Lc2 as shown in FIG. 17C.

Furthermore, the duplication manager 201 stores the physical addresses Pc0 and Pc1 of physical areas to which the chunks Cc0 and Cc1 have been written, in respective entries in the chunk table 207 associated with the chunk numbers 6 and 7 of the chunks Cc0 and Cc1 as shown in FIG. 18C. In the chunk table 207, the duplication manager 201 further sets 1 for each of the reference counts RCNT paired with the physical addresses Pc0 and Pc1. The duplication manager 201 further updates the reference count RCNT in an entry in the chunk table 207 associated with the chunk number 0 of the chunk Ca0 having the same content (A) as the content of the chunk Cc2, from 2 shown in FIG. 18B to 3 shown in FIG. 18C.

Now, it is assumed that the host 20 requests the storage controller 12 to delete the file F1. In this case, the duplication manager 201 invalidates the contents of three entries in the meta table 206 associated with the logical addresses Lb0, Lb1, and Lb2 as shown in FIG. 17D. In FIG. 17D, invalid entries are shown by diagonal lines. For such invalidation, a particular bit in each of the entries in the meta table 206 is used as a valid bit indicating whether or not the content of the entry is valid.

The duplication manager 201 sets the valid bit in each of the three entries in the meta table 206 associated with the logical addresses Lb0, Lb1, and Lb2 to a status (for example, "0") indicating that the content of the entry is invalid. The duplication manager 201 further updates the reference counts RCNT in respective entries in the chunk table 207 associated with the chunk numbers 4, 5, and 0 of the chunks Cb0, Cb1, and Cb2 included in the file F1 to be deleted, from 1, 1, and 3 shown in FIG. 18C to 0, 0, and 2 shown in FIG. 18D.

According to the embodiment, if, in such a state, a new chunk is written to the HDD/SSD array 11, a chunk number 8 is imparted to the new chunk. At this time, no effective chunks provided with the chunk numbers 4 and 5 are present. Thus, the embodiment executes a defragmentation process during a wait time of the storage controller 12 or in accordance with an instruction from the host 20. That is, effective chunks stored in the HDD/SSD array 11 are rearranged, for example, for each file, in an area in the HDD/SSD array 11 which has consecutive physical addresses. At this time, consecutive chunk numbers are newly imparted to all the effective chunks. The hash table 205, the meta table 206, and the chunk table 207 are correspondingly updated.

At least one embodiment described above can provide a storage system, a storage controller, and a method which can speed up hash table searches for eliminating data duplication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
   a storage device;
   a storage controller configured to control access to the storage device; and
   a hash table including a first table and a second table, the first table having a first number of entries, and the second table having a second number of entries, the second number being larger than the first number;
   wherein the storage controller comprises:
      a dividing unit configured to divide data specified in a write request from a host computer into a plurality of chunks,
      a hash generation unit configured to calculate a hash value for each of the plurality of chunks based on the data in each of the plurality of chunks, the hash value having a first length,
      an access controller configured to write the chunks to the storage device,
      a duplication manager configured to preferentially store a first hash value of a first chunk in the first table in the hash table in association with the first chunk when the first chunk is written to the storage device, and
      a duplication determination unit configured to determine whether a third chunk is stored in the storage device by executing a process of searching the hash table for a third hash value matching a second hash value of a second chunk such that the first table is preferentially searched when the second hash value has been calculated, the third chunk having a content identical to a content of the second chunk;
   wherein:
      the duplication manager is further configured to inhibit the second chunk from being written to the storage device when the third chunk is determined to be stored in the storage device;
      the first table comprises a plurality of first pages used to store a plurality of hash values for a plurality of respective groups into which the plurality of hash values are classified based on the plurality of hash values;
      the plurality of first pages are associated with a respective plurality of group indices pointing to the plurality of groups;
      each of the plurality of hash values has the first length;
      each of the plurality of first pages has a third number of entries;
      a total number of entries in the plurality of first pages is equal to the first number;
      the second table comprises a plurality of second pages associated with the respective plurality of group indices;
      each of the plurality of second pages has a fourth number of entries, the fourth number being lamer than the third number; and
      a total number of the plurality of second pages is equal to the second number;
   the duplication determination unit is further configured to:
      identify a group to which the second hash value of the second chunk belongs based on the second hash value;
      preferentially select the first page associated with a group index of the identified group;
      search the selected first page for the third hash value;
      select the second page associated with the group index of the identified group when the search of the selected first page for the third hash value has failed and when the third number of entries in at least the selected first page are all in use; and
      search the selected second page for the third hash value; and
   the duplication manager is further configured to store the first hash value in a last selected page that is one of the first page and the second page when the third chunk is determined not to be stored in the storage device.

2. The storage system of claim 1, wherein:
   the hash generation unit is further configured to calculate a hash value having a second length shorter than the first length and used as the group index based on the hash value having the first length; and
   the duplication determination unit is further configured to use a fourth hash value as a group index specifying a group to be searched for the third hash value when the hash table is searched for the third hash value, the fourth hash value having the second length and being calculated based on the second hash value.

3. The storage system of claim 1, wherein:
   the storage controller further comprises a volatile memory and a local storage device;
   the hash table is stored in the storage device or the local storage device,
   each of the plurality of first pages includes management information indicative of a number of entries in use in the first page and a number of entries in use in the second page associated with the group index of the group to which the first page belongs;
   and the duplication determination unit is further configured to:
      load the first page into the volatile memory when the first page is selected,
      search the loaded first page for the third hash value,
      select the second page when the search of the loaded first page for the third hash value has failed and when the number of entries in use in the second page is not zero, the number of entries in use in the second page being indicated by the management information included in the loaded first page,
      load the selected second page into the volatile memory, and
      search the loaded second page for the third hash value.

4. A storage controller configured to control access to a storage device, the storage controller comprising:
   a dividing unit configured to divide data specified in a write request from a host computer into a plurality of chunks;
   a hash generation unit configured to calculate a hash value for each of the plurality of chunks based on the data in each of the plurality of chunks, the hash value having a first length;
   an access controller configured to write the chunks to the storage device;
   a duplication manager configured to preferentially store a first hash value of a first chunk in a first table in a hash table in association with the first chunk when the first chunk is written to the storage device, the hash table including the first table and a second table, the first table having a first number of entries, and the second table having a second number of entries, the second number being larger than the first number; and
   a duplication determination unit configured to determine whether a third chunk is stored in the storage device by executing a process of searching the hash table for a third hash value matching a second hash value of a second chunk such that the first table is preferentially searched when the second hash value has been calculated, the third chunk having a content identical to a content of the second chunk;

wherein:
the duplication manager is further configured to inhibit the second chunk from being written to the storage device when the third chunk is determined to be stored in the storage device,
the storage controller further comprises a local storage device, the hash table is stored in the storage device or the local storage device,
the first table comprises a plurality of first pages used to store a plurality of hash values for a plurality of respective groups into which the plurality of hash values are classified based on the plurality of hash values,
the plurality of first pages are associated with a respective plurality of group indices pointing to the plurality of groups,
each of the plurality of hash values has the first length,
each of the plurality of first pages has a third number of entries,
a total number of entries in the plurality of first pages is equal to the first number,
the second table comprises a plurality of second pages associated with the respective plurality of group indices,
each of the plurality of second pages has a fourth number of entries, the fourth number being larger than the third number;
a total number of the plurality of second pages is equal to the second number;
the duplication determination unit is further configured to:
identify a group to which the second hash value of the second chunk belongs based on the second hash value;
preferentially select the first page associated with a group index of the identified group;
search the selected first page for the third hash value;
select the second page associated with the group index of the identified group when the search of the selected first gape for the third hash value has failed and when the third number of entries in at least the selected first page are all in use; and
search the selected second page for the third hash value; and
the duplication manager is further configured to store the first hash value in a last selected gape that is one of the first gape and the second page when the third chunk is determined not to be stored in the storage device.

5. The storage controller of claim 4, wherein:
the hash generation unit is further configured to calculate a hash value having a second length shorter than the first length and used as the group index based on the hash value having the first length; and
the duplication determination unit is further configured to use a fourth hash value as a group index specifying a group to be searched for the third hash value when the hash table is searched for the third hash value, the fourth hash value having the second length and being calculated based on the second hash value.

6. The storage controller of claim 4, further comprising a volatile memory, wherein:
each of the plurality of first pages includes management information indicative of a number of entries in use in the first page and a number of entries in use in the second page associated with the group index of the group to which the first page belongs; and
the duplication determination unit is further configured to:
load the first page into the volatile memory when the first page is selected;
search the loaded first page for the third hash value,
select the second page when the search of the loaded first page for the third hash value has failed and when the number of entries in use in the second page is not zero, the number of entries in use in the second page being indicated by the management information included in the loaded first page,
load the selected second page into the volatile memory, and
search the loaded second page for the third hash value.

7. A method, implemented in a storage controller, for eliminating data duplication based on a hash table, the storage controller being configured to control access to a storage device and comprising a local storage device, the method comprising:
dividing data specified in a write request from a host computer into a plurality of chunks;
calculating a hash value for each of the plurality of chunks based on the data in each of the plurality of chunks, the hash value having a first length;
preferentially storing a first hash value of a first chunk in a first table in the hash table in association with the first chunk when the first chunk is written to the storage device, the hash table including the first table and a second table and being stored in the storage device or the local storage device, the first table having a first number of entries, and the second table having a second number of entries, the second number being larger than the first number;
executing a process of searching the hash table for a third hash value matching a second hash value of a second chunk such that the first table is preferentially searched when the second hash value has been cancelled;
determining whether a third chunk is stored in the storage device based on a result of the search, the third chunk having a content identical to a content of the second chunk; and
inhibiting the second chunk from being written to the storage device when the third chunk is determined to be stored in the storage device;

wherein:
the first table comprises a plurality of first pages used to stare a plurality of hash values for a plurality of respective groups into which the plurality of hash values are classified based on the plurality of hash values,
the plurality of first pages are associated with a respective plurality of group indices pointing to the plurality of groups,
each of the plurality of hash values has the first length,
each of the plurality of first pages has a third number of entries,
a total number of entries in the plurality of first pages is equal to the first number,
the second table comprises a plurality of second indices,
each of the plurality of second pages has a fourth number of entries, the fourth number being larger than the third number, and
a total number of the plurality of second pages is equal to the second number; and the method further comprises:
- identifying a group to which the second hash value of the second chunk belongs based on the second hash value;
- preferentially selecting the first page associated with a group index of the identified group,
- selecting the second page associated with the group index of the identified group when the search of the selected first page for the third hash value has failed and when the third number of entries in at least the selected first page are all in use,
- searching the selected second page for the third hash value, and
- storing the first hash value in a last selected page that is one of the first page and the second page when the third chunk is determined not to be stored in the storage device.

8. The method of claim 7, further comprising:
- calculating a hash value having a second length shorter than the first length and used as the group index based on the hash value having the first length; and
- using a fourth hash value as a group index specifying a group to be searched for the third hash value when the hash table is searched for the third hash value, the fourth hash value having the second length and being calculated based on the second hash value.

9. The method of claim 7, wherein:
the storage controller further comprises a volatile memory, and
each of the plurality of first pages includes management information indicative of a number of entries in use in the first page and a number of entries in use in the second page associated with the group index of the group to which the first page belongs;
and wherein the method further comprises:
- loading the first page into the volatile memory when the first page is selected,
- searching the loaded first page for the third hash value,
- selecting the second page when the search of the loaded first page for the third hash value has failed and when the number of entries in the second page is not zero, the number of entries in use in the second page being indicated by the management information included in the loaded first page,
- loading the selected second page into the volatile memory, and
- searching the loaded second page for the third hash value.

* * * * *

UNITED STATES PATENT AND TRADEMARK OFFICE
CERTIFICATE OF CORRECTION

PATENT NO. : 9,152,341 B2  
APPLICATION NO. : 13/955626  
DATED : October 6, 2015  
INVENTOR(S) : Yamazaki Page 1 of 1

It is certified that error appears in the above-identified patent and that said Letters Patent is hereby corrected as shown below:

In the Claims

Claim 4, column 25, line 43, change "gape" to --page--.

Claim 4, column 25, line 49, change "gape" to --page--.

Claim 4, column 25, line 50, change "gape" to --page--.

Signed and Sealed this  
Eighth Day of March, 2016

Michelle K. Lee  
*Director of the United States Patent and Trademark Office*